(12) United States Patent
Hunt et al.

(10) Patent No.: US 9,883,770 B2
(45) Date of Patent: Feb. 6, 2018

(54) VERTICAL GRILL WITH EXTERNAL DRIP TRAY MODULE

(71) Applicants: Bonnie Lee Buzick, Fresno, CA (US); Robert James Bair, Fresno, CA (US)

(72) Inventors: Ronald Eugene Hunt, Buck Bend, TX (US); Bonnie Lee Buzick, Fresno, CA (US); Robert James Bair, Fresno, CA (US)

(*) Notice: Subject to any disclaimer, the term of this patent is extended or adjusted under 35 U.S.C. 154(b) by 476 days.

(21) Appl. No.: 14/493,348

(22) Filed: Sep. 23, 2014

(65) Prior Publication Data
US 2015/0257593 A1    Sep. 17, 2015

Related U.S. Application Data

(60) Provisional application No. 61/951,516, filed on Mar. 11, 2014.

(51) Int. Cl.
*A47J 37/00*    (2006.01)
*A47J 37/07*    (2006.01)
*A47J 37/06*    (2006.01)
*A47J 37/08*    (2006.01)

(52) U.S. Cl.
CPC ....... *A47J 37/0718* (2013.01); *A47J 37/0676* (2013.01); *A47J 37/0688* (2013.01); *A47J 37/0786* (2013.01); *A47J 37/0807* (2013.01); *A47J 37/0871* (2013.01); *A47J 37/0754* (2013.01)

(58) Field of Classification Search
CPC .. A47J 37/067; A47J 37/0676; A47J 37/0682; A47J 37/0688; A47J 37/0786
USPC ........ 99/385, 386, 387, 389, 390, 391, 392, 99/393, 400, 401, 444, 445, 446
See application file for complete search history.

(56) References Cited

U.S. PATENT DOCUMENTS

| | | | | |
|---|---|---|---|---|
| 917,195 | A * | 4/1909 | Aller | A47J 37/0688 126/41 R |
| 3,971,308 | A * | 7/1976 | Parker | A23B 4/052 99/467 |
| 4,574,770 | A * | 3/1986 | Wells | A47J 37/0786 126/25 R |
| 4,979,436 | A * | 12/1990 | McGowan | A23B 4/052 126/25 R |
| 5,878,657 | A * | 3/1999 | Gschwind | A47J 37/0704 99/400 |
| 6,502,504 | B1 * | 1/2003 | Gschwind | A47J 37/0713 99/400 |

* cited by examiner

*Primary Examiner* — Reginald L Alexander
(74) *Attorney, Agent, or Firm* — Michael D. Eisenberg

(57) ABSTRACT

A vertical grill comprises a back chimney within the housing having an inlet and an outlet. The inlet is in the form of one or more first openings in the back frame member, and the outlet being a second opening which is higher than the inlet. A first air intake located in at least one of the grill's panels. A removable tray module comprises a slide positioned at an incline between the front and back sides, configured to direct fats and break away solids to the front side of the tray. At least one channel is covered by the slide and configured for air flow. An external receptacle is positioned at the front side of the tray, wherein the slide leads into the receptacle so that fats and break away solids may be channeled into the external receptacle after traveling downwards along the incline of the slide.

14 Claims, 22 Drawing Sheets

HEAT SHIELD

VERTICAL GRILL WITH EXTERNAL DRIP TRAY MODULE

CROSS-REFERENCE TO RELATED APPLICATIONS

This application claims priority from U.S. Provisional Application Ser. No. 61/951,516 filed Mar. 11, 2014, which is hereby incorporated herein by reference in the respective in its entirety.

TECHNICAL FIELD

This invention relates to cooking appliances for use in domestic and commercial kitchens. The invention relates particularly to electric grills that can be used to cook food in a way that removes fat from the food that is cooked. In particular the invention relates to a vertical electric grill and a removable slide and tray module for directing fats and breakaway solids from the inside of the grill to the tray's exterior receptacle for safe storage and cooling during the cooking process.

BACKGROUND OF THE INVENTION

Obesity together with heart disease has been linked to high consumption of saturated fats and cholesterol found in most meat products. The American Heart Association ("AHA") has recommended that individuals should, in order to reduce the risk of heart disease and cancer, reduce their daily intake of saturated fats and cholesterol.

Grills in which the radiant cooking elements and grilling space have been arranged vertically are particularly well adapted to cook the food on both sides simultaneously and to remove fats from meat that is being cooked. As the food is suspended between the cooking elements gravity and pressure of a holding clasp act to separate liquefied fats and oils from the food such that the liquefied fats and oils drip out of and away from the food being cooked. Vertical grills have been recommended by heart physicians as a suitable device to help patients and the public reduce their intake of saturated fats that would otherwise be ingested with conventionally cooked meats.

However, there were problems associated with prior art vertical grills. The prior art vertical grills used an internal drip tray to collect and retain combustible fats, oils, and waste solids that fall from the food being grilled between two radiant cooking elements. Unfortunately, the prior art vertical grills with an internal drip tray are prone to fire flare-ups and smoke.

As a result, if the internal drip tray is not cleaned thoroughly before each use to ensure there are no combustible fats or solids present in the tray, there is a propensity for the contents of the tray to combust. Further, with a view to combating this propensity for combustion, users were advised to add a small quantity of cold water to the internal drip tray before each use to reduce the volatility of the liquefied fats and oils that accumulate in the tray during cooking.

The danger of ignition resulting in fire or smoke was exacerbated by the fact that the drip tray in the prior art vertical grills was concealed within the body of the grill, where it was difficult for the user to observe the contents of the tray without first removing the drip tray from the prior art vertical grill. This would frequently result in users powering on the exposed electric grilling elements situated directly above the combustible contents of the drip tray without prior knowledge of the drip trays contents or the danger of fire and smoke these contents presented. Unaware that the prior art vertical grill's drip tray contained flammable fats and waste, many users would not take steps to remove and clean the tray before reinserting it into the grill with a quantity of cold water as instructed by the safety provisions that accompanied the grill.

In order to diminish of fire risk, some prior art vertical grill designs employ an internal drip tray that features a fire suppressing perforated metal cover. However, this design has its drawbacks. First, the perforated cover actually makes it more likely that a user of the device will forget to empty the contents of the drip tray as the retained fats and solid spoils are substantially obscured by the internal drip tray cover. In such a case where the internal drip tray is hidden from view within the body of the vertical grill, dangerous reserves of retained fats and oils can easily go unobserved. Further, the use of a perforated metal fire suppressing shield results in solid spoils and embers from above, coming to rest on the protective fire shield. These solids sometimes block the perforations resulting in an accumulation of fats and oils on the shield's surface. This may result in smoldering embers and ignited fats entering into the internal cavities of the device, and/or cause the fats in the drip tray to ignite despite the presence of the fire suppressing shield. It is a common complaint by users of the vertical grill that a blocked or inappropriately prepared internal drip tray can permit smoldering embers to activate kitchen fire alarms. Furthermore, by covering or compressing the combustible contents of the drip tray with a metal shield, ignition of its contents can cause the tray to explode.

It is an object of the present invention to improve on the design of prior art vertical grills and/or to substantially ameliorate some of the shortcomings of the prior art vertical grills.

BRIEF SUMMARY OF EMBODIMENTS OF THE INVENTION

An aspect of some embodiments of the present invention relates to a removable slide and drip tray module with external receptacle for use in a grill. The drip tray of the present invention includes a slide which guides the separated hot, liquified fats and breakaway solids (all of which form a group which will be herein called "discarded waste") generated by the grilling of the food to the external collection receptacle positioned at the lowest point of the module for cooling and disposal outside the body of the grill. The drip tray includes one or more channels configured for enabling passage of air therethrough and enabling the airflow to contact the slide. In this manner, the discarded waste of the grilled food is cooled while they are located inside the grill and as they slide toward the external receptacle. In this manner, the risk of fire inside the grill is reduced. This also removes the need for an internal drip tray and hence it is unnecessary to add cold water to a drip tray in close proximity to the grills electric cooking elements or in any event to position a drip tray within the body of the grill or furthermore to apply a fire suppressant shield thereto. Thus the dangers and preliminary steps necessary for use of and the need for an internal drip tray are eliminated.

(1) In a variant, a drip tray module for a grill is configured to catch fats and break away solids generated during the cooking process. The tray comprises a front side, back side, bottom side, and left and right sides. A slide is positioned at an incline between the front and back sides, configured to direct fats and break away solids away from back side to the front side of the tray. At least one channel for air flow covered by the slide. An external receptacle is positioned at the front side of the tray, wherein the slide leads into the receptacle so that fats and break away solids may be channeled into the external receptacle after traveling downwards along the incline of the slide. An air intake hole is in at least one side of the tray module and is configured to allow cool external air into the tray module.

(2) In another variant of the drip tray module, the slide comprises two surfaces leading to a middle surface and disposed on either side of the middle surface and are angled higher than the middle the surface. The tray module further comprises a step in the left and right sides to receive a recessed bottom panel of the grill, and hang over the edge of the bottom panel of the grill, when the tray is inserted into the grill.

(3) In a further variant, the drip tray module further comprises a plurality of ribs defining a plurality of channels, supporting the slide and maintaining a gap between the floor of the channels and the slide to provide air channels under the slide which enable air to flow through openings in a front end and of the channels out of openings in the back end of the channels. The back end of the channels are on the back side of the drip tray module.

(4) In still another variant, the drip tray module comprises floor members in the channels and apertures in the floor members to allow air to flow from underneath the tray and into the channels.

(5) In yet a further variant of the drip tray module, the module is formed from a bottom tray and the slide, the slide being removable from the bottom tray.

(6) In another variant of the drip tray module, the module is formed from a bottom tray and the slide. The tray module further comprises a gap formed near the front of the tray module between the slide and the bottom tray, wherein lateral side panels of the slide are of sufficient length to create the gap between the slide and the bottom tray to allow air to flow into the gap.

(7) In a further variant, the drip tray module comprises at least one opening in either the left or right side of the tray.

(8) In still another variant, the drip tray module of claim 1, wherein the slide is formed from a heat conductive material to enable heat exchange between the air flowing below the plate and the discarded waste sliding on the plate.

(9) In yet a further variant of the drip tray module, wherein the plate is made of metal and the drip tray module includes magnets configured to attach the metal plate to the tray module.

(10) In variant of the drip tray module of, the sides of the tray form an air space underneath the tray that allows for air flow from below the tray and into channels formed below the slide via apertures in the floor of the channels.

(11) In another variant, a grill comprises a housing which comprises a front panel, a back panel, a bottom panel, a right panel, and a left panel. A back chimney extends vertically and is bounded by a back frame member within the housing and the back panel. The back chimney has an inlet and an outlet. The inlet is in the form of one or more first openings in the back frame member, and the outlet is a second opening which is higher than the inlet. A first air intake is located in at least one of the grill's left panel, right panel, back panel, and bottom panels. A removable tray module for the grill comprises a front side, back side, bottom side, and left and right sides. A slide is positioned at an incline between the front and back sides, configured to direct fats and break away solids away from back side to the front side of the tray. At least one channel is covered by the slide and configured for air flow, the channel having a front open end and a back open end, the back open end being aligned with the tray module's back side. An external receptacle is positioned at the front side of the tray, wherein the slide leads into the receptacle so that fats and break away solids may be channeled into the external receptacle after traveling downwards along the incline of the slide. An air intake hole is in at least one side of the tray module configured to allow external air into the tray module and into the at least one channel. The removable tray module is configured for being slid into and out of the grill via an aperture in the front panel, such that when the tray module is in an operating position inside the grill, the tray module's back side rests against the back frame and the back chimney's inlet is aligned with the channel's back open end, for enabling passage of air from the at least one channel to the back chimney. The air intake is at least partially aligned with the air intake hole, and the grill is configured for drawing air via the air intake, such that the drawn air passes through the air intake hole, the channel, the back chimney, and exits the back chimney's outlet.

(12) In a further variant of the vertical grill of claim 11 wherein the aperture of the grill's front panel is sized such that a gap exists between the lowermost point of the grill's front panel and the uppermost point of the tray module when the tray module is in the operating position, the gap enabling passage of air from outside along the slide.

(13) In yet another variant, the vertical grill comprises a front frame member inside the housing, such that the front panel and the front member form a front chimney. The front chimney is configured for drawing at least some of the outside air via the gap.

(14) In still a further variant of the vertical grill, the grill has removable side heat shields inside the vertical grill.

(15) In a variant of the vertical grill, the heat shield is located beneath a cooking basket and is configured for directing fats and break away solids generated during the cooking process onto the slide.

(16) In another variant, the vertical grill comprises a cooking basket for holding food is in the middle of the grill. At least one heat generating device is located near the cooking basket and at least one removable heat shield is located between the heat generating device and a panel of the housing closest to the heat generating device.

(17) In a further variant of the grill, the back panel comprises at least one vent hole. The back frame member comprises at least one vent opening aligned with the vent hole. The back side of the removable tray module comprises at least one back aperture aligned with the vent hole and the vent opening, thus enabling air flow from outside via the vent hole, the vent opening, and the back aperture into the channel.

(18) In yet another variant, the grill comprises a wall between the back panel and the back frame member. The wall is located above the vent hole and the vent opening and below the inlet of the back chimney, so as to prevent entry of air from the vent hole into the back chimney.

(19) In still a further variant, the grill comprises one or more first legs configured for elevating the bottom panel of the grill with respect to a surface upon which the grill is located. The bottom panel is recessed with respect to the front panel. The drip tray module comprises one or more second legs configured for elevating the external receptacle with respect to a surface upon which the grill is located. At least one of the left side and the right side of the drip tray module comprises an extension extending downward, and configured for engaging the bottom panel of the grill to prevent forward movement of the drip tray module inside the grill. The front open end of at least one channel is configured for enabling passage of air via a first space between the bottom panel and the surface upon which the grill is located and/or via a second space between the external receptacle and the surface upon which the grill is located.

(20) In a variant, a grill comprises a housing which comprises a front panel, a back panel, a bottom panel, a right panel, and a left panel. A back chimney extends vertically and is bounded by a back frame member within the housing and the back panel. The back chimney has an inlet and an outlet. The inlet is in the form of one or more openings in the back frame member, and the outlet is an aperture which is higher than the inlet. A first air intake is located in at least one of the grill's left panel, right panel, back panel, and bottom panel.

(21) In another variant, the grill comprises one or more first legs configured for elevating the bottom panel of the grill with respect to a surface upon which the grill is located, wherein, the bottom panel is recessed with respect to the front panel.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
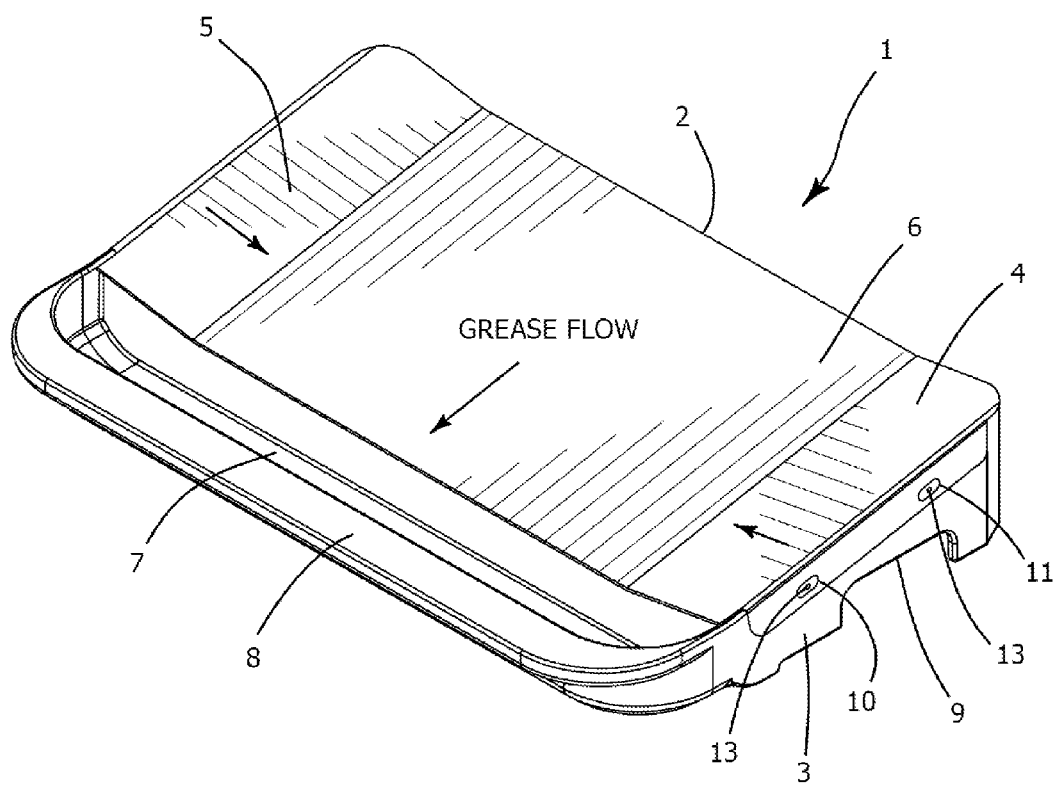
FIG. 1 is perspective view of a drip tray module in accordance with the principles of the invention.
Figure 2:
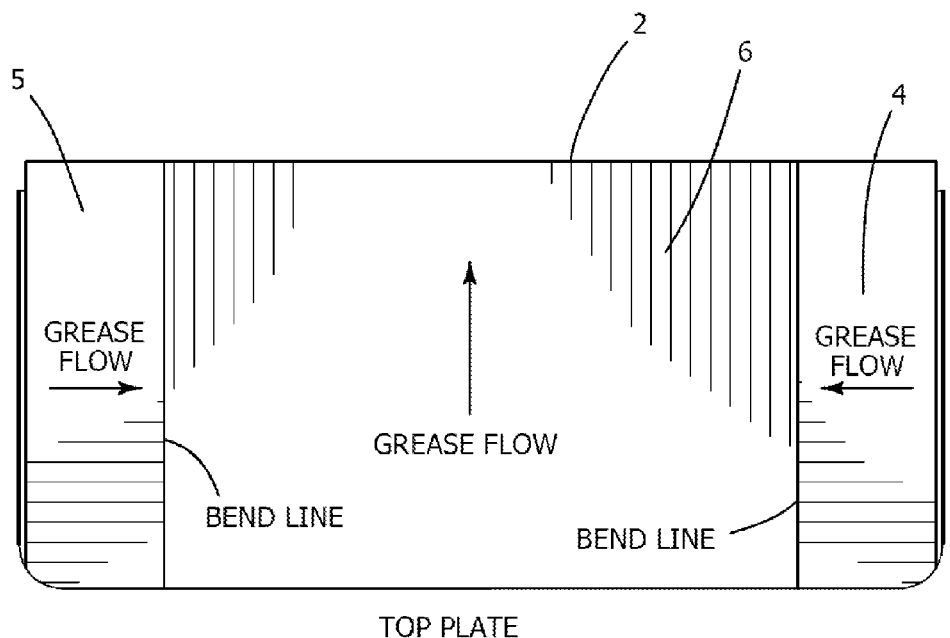
FIG. 2 is a top view of a slide that serves as a cover of the drip tray and a slide for fats, grease and break away solids.
Figure 7:
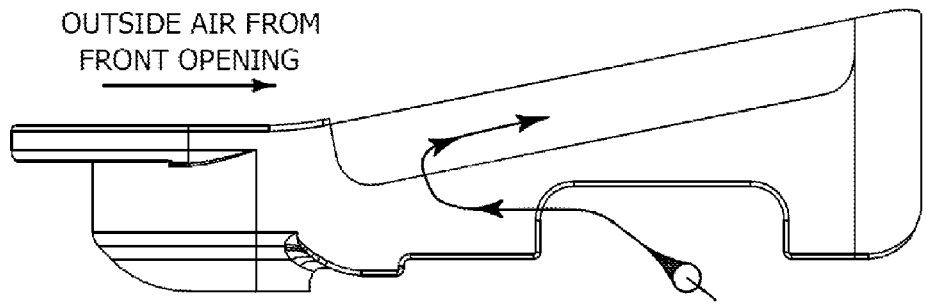
FIG. 7 is a right side view of the grease tray assembly illustrating air flow through the assembly.
Figure 8:
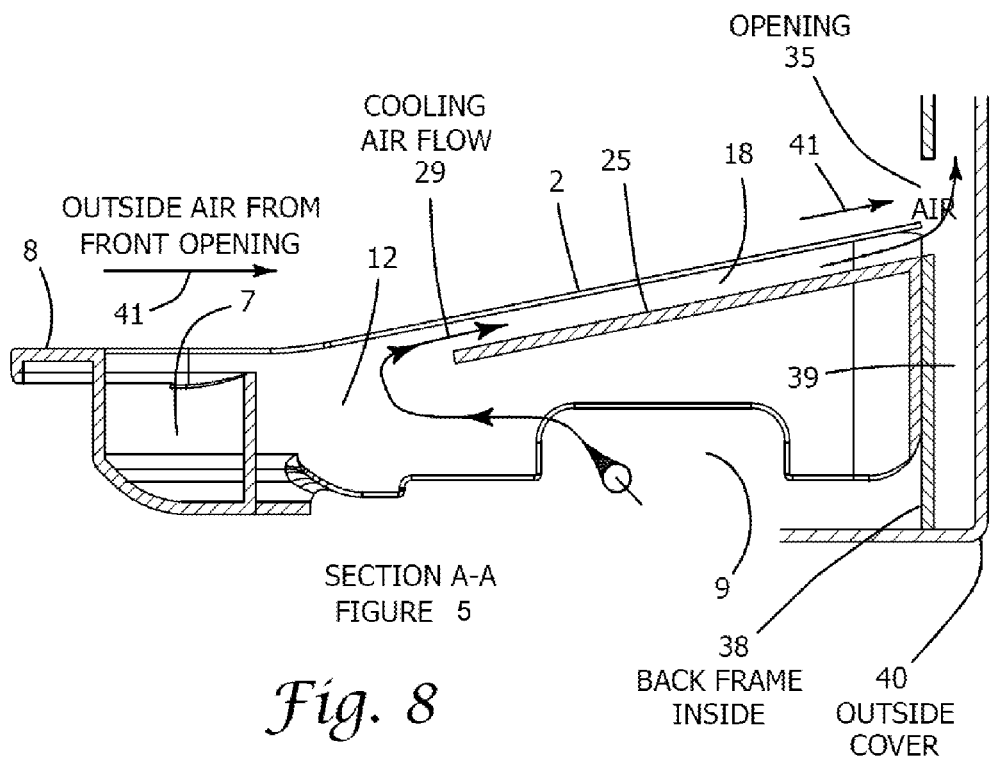
FIG. 8 is a sectional view of the grease tray assembly through the plane A-A in FIG. 5.

An aspect of some embodiments of the present invention is directed toward an external drip tray for a vertical grill. Before describing the details of the tray of the present invention, a vertical grill will be described FIG. 1 is an isometric view of a grease tray assembly generally designated as numeral 1. FIG. 7 is a right side view of the tray assembly and FIG. 8 is a sectional view of the tray assembly. The tray assembly is configured to catch the discarded waste dripping from food inside the vertical grill during cooking and to channel the discarded waste (fats, grease and break away solids) from inside the grill to an external receptacle component 7.

Figure 3:
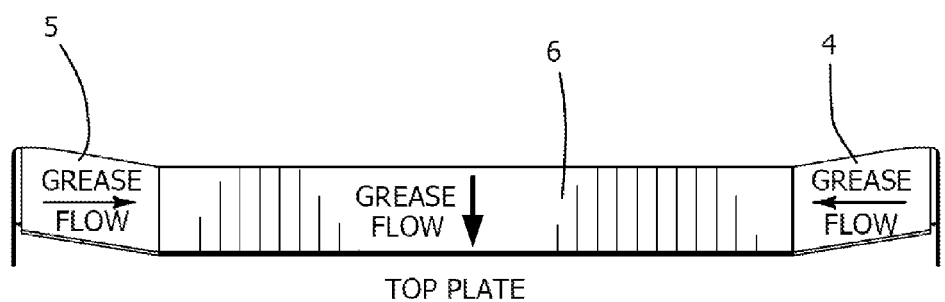
FIG. 3 is a front view of the slide.
Figure 4:
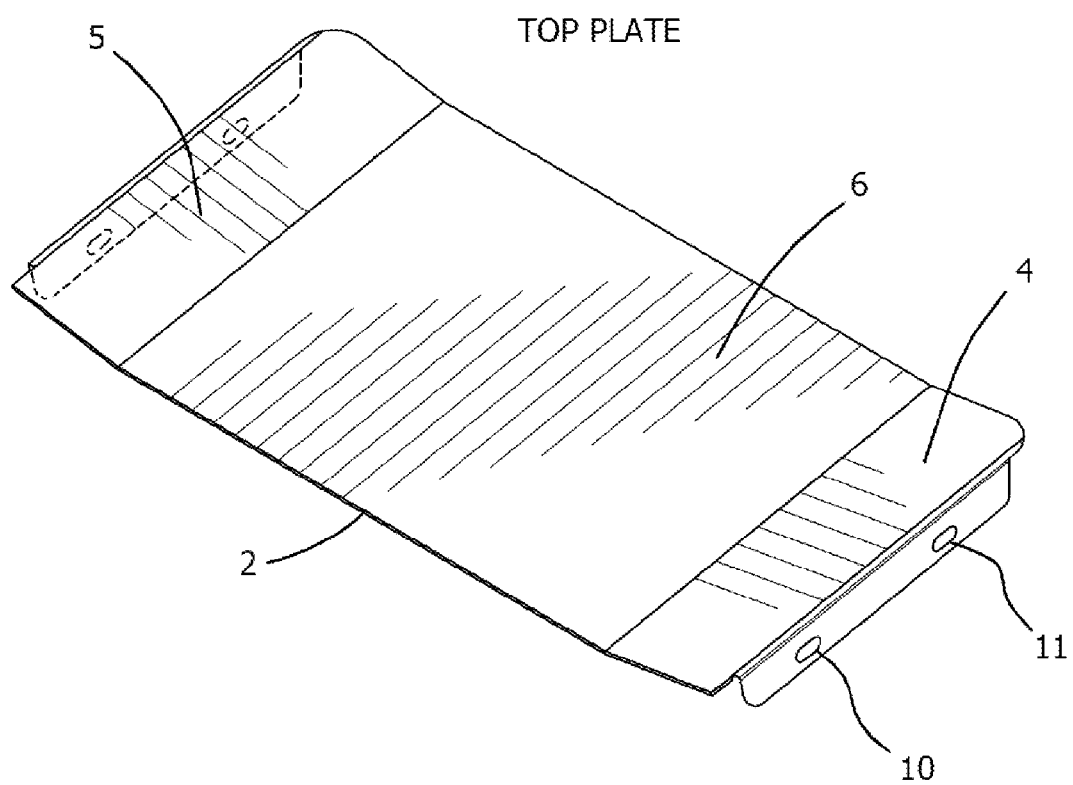
FIG. 4 is an isometric view of the slide.

Referring to FIGS. 2-4 and 8, FIG. 2 is a top view of a slide 2 which is part of the tray of the present invention; FIG. 3 is a front view of the slide 2. FIG. 4 is an isometric drawing of slide 2. FIG. 8 is a sectional view of the grease tray assembly.

The grease tray assembly 1 includes a top plate/slide 2 and a bottom tray 3. The slide 2 covers the bottom tray 3. The bottom tray 3 may be a one piece molded plastic base. Optionally, the bottom tray 3 is made of a fireproof material. The slide 2 is inclined downward toward the external receptacle component 7, so as to lead the discarded waste to the external receptacle component. In a non-limiting example, the inclination of the slide 2 is approximately 15 degrees. For a common grill, the inside of which reaches temperatures of 400 to 500 degrees Fahrenheit, the inclination angle in the present invention can be low since the cooling effect of the panel 2 enables to discarded waste to slowly travel along the panel without reaching flashpoint temperatures (the flash point temperature being the temperature above which the discarded waste catches fire or smokes). Having a low inclination is particularly advantageous for keeping the profile of the vertical grill low. A higher temperature within the vertical grill would require the inclination angle to be increased to accelerate the draining of the discarded waste to the outside tray receptacle before flash point temperature is reached.

The slide 2 includes lateral side surfaces 4, 5, and a middle surface 6 located between the side surfaces. The side surface 4 and 5 are slanted toward the middle of slide 2 to drain grease from the sides to the middle surface 6. At the front of bottom molded tray 3 is an external receptacle component 7. The external receptacle component 7 may be removably attached to the tray. Optionally, a tray handle 8 is located on the front of the external receptacle component 7, to ease the tray's insertion to and removal from the grill.

There is an air intake opening 9 on at least one side of the tray to supply cooling air to the tray module. To retain the slide 2 on the bottom tray 3, the slide 2 includes at least one slot (optionally two slots 10, 11) on at least one lateral side of the slide 2. The slot(s) is (are) configured for mating with corresponding holding button(s) 13. Optionally, an identical slot/button arrangement is provided for each of the two lateral sides of the tray assembly. The slot/button arrangement enables the slide 2 to be removably joined to bottom molded tray 3, so that the slide 2 can be easily removed for cleaning.

Figure 5:
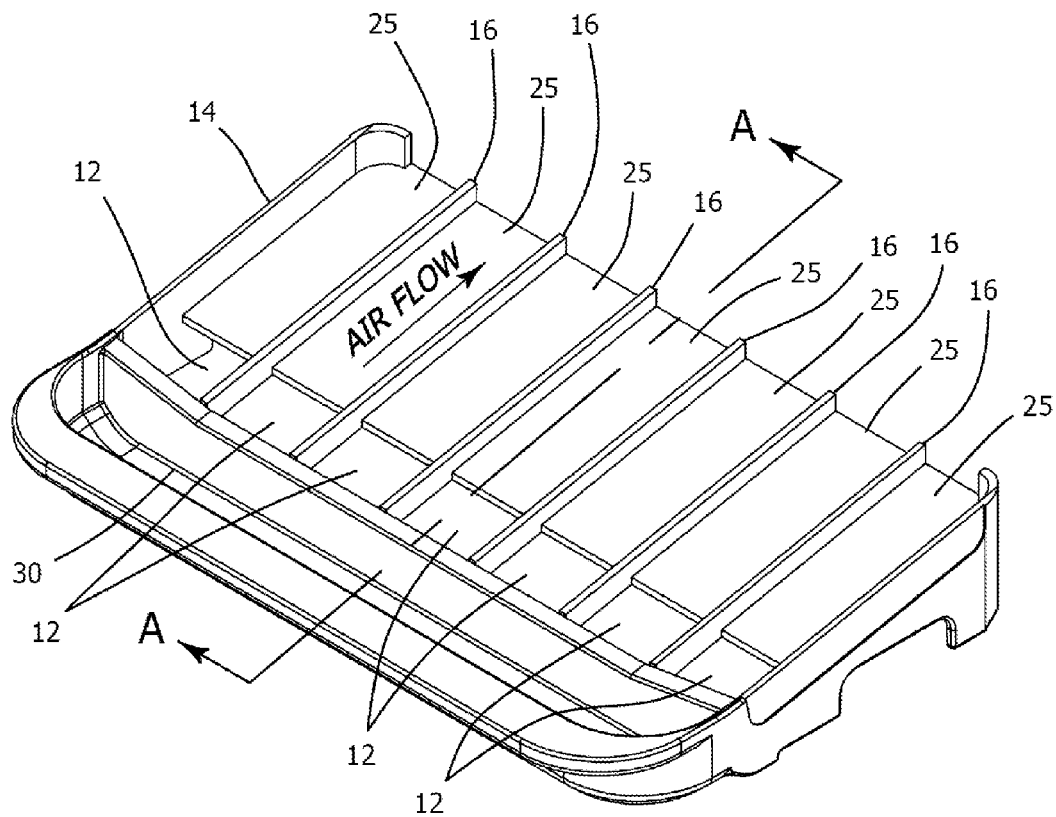
FIG. 5 is an isometric view illustrating a bottom tray with the top slide removed.
Figure 6:
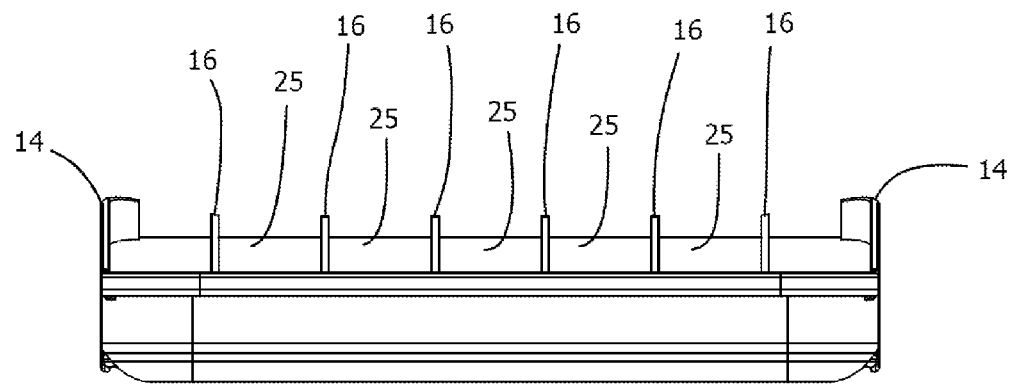
FIG. 6 is a rear view of the bottom tray with the top slide removed.
Figure 20:
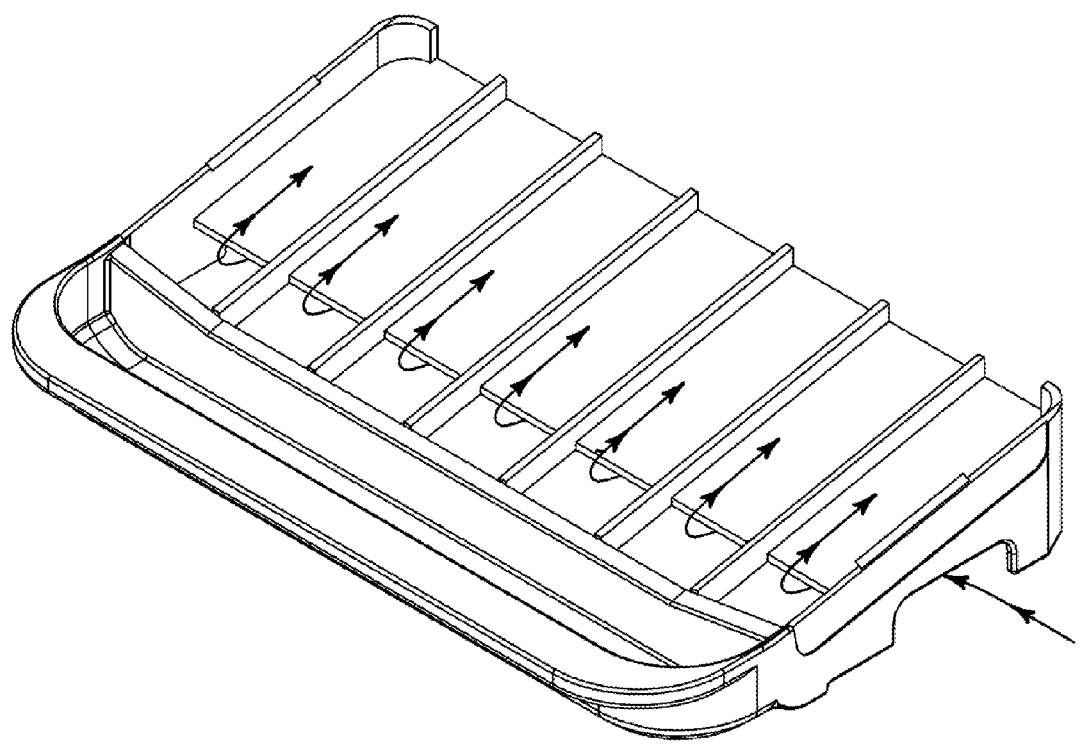
FIG. 20 is an isometric view illustrating air flow through the bottom molded tray of FIG. 5.

Referring to FIGS. 5, 8, and 20, there is provided an isometric drawing illustrating a bottom tray 3 with the top metal slide 2 removed. Lateral ends 14 along with ribs 16 support the slide 2 and maintain a gap between the floor of the bottom tray and slide 2. In this manner, floor members 25, in conjunction with the slide 2, provide air tunnels 18 (as shown in FIG. 8) under slide 2. Cool air comes in through end opening 9 then flows up through apertures 12 in the floor members and on in direction of air flow arrow 29, through the tunnels to the back of the tray. The cool air cools the slide 2 and thus keeps the discarded waste below flash point temperature.

Figure 15:
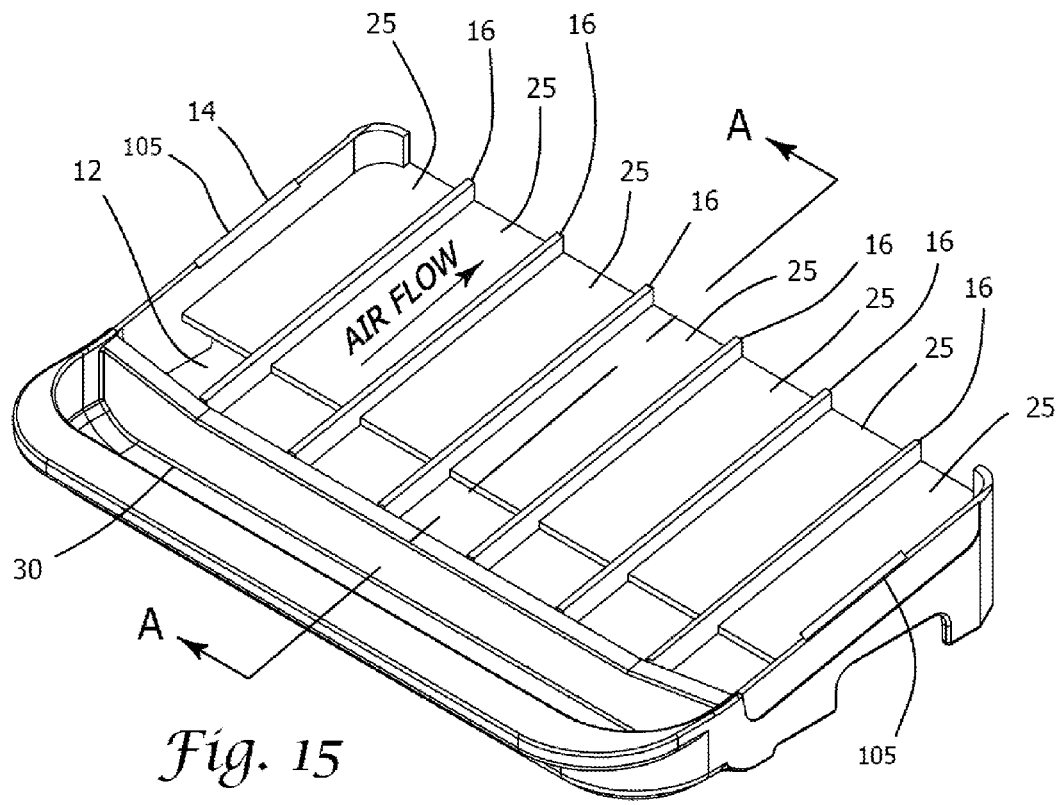
FIG. 15 is an illustration of the tray assembly having magnets for securing the metal slide to the tray assembly.
Figure 16:
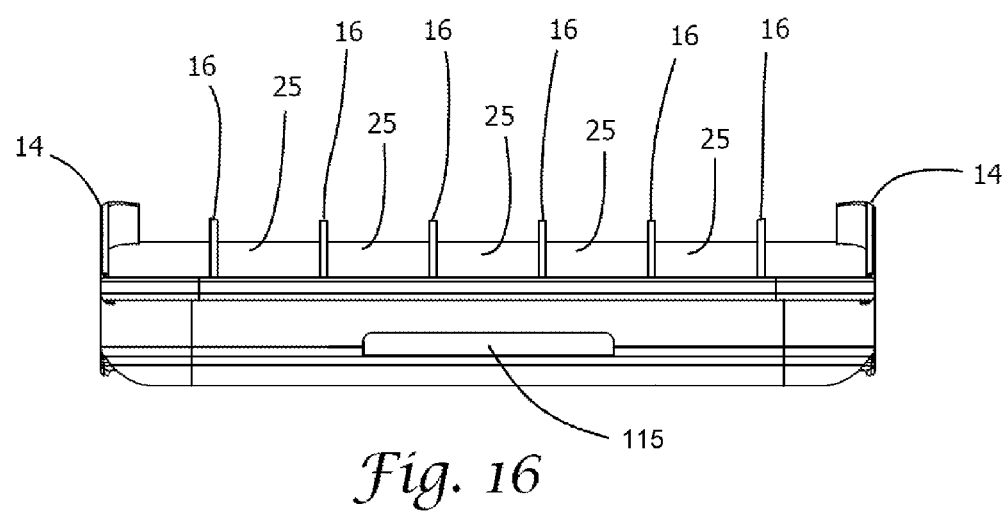
FIG. 16 is a rear view of the tray of FIG. 15 having an opening for air flow.

Optionally, the slide 2 is made of a heat conductive material to enable heat exchange between the air flowing below the slide and the discarded waste sliding on the slide 2, thus facilitating the cooling of the discarded waste. In a variant, referring to FIGS. 15 and 16, the slide 2 is made of metal, and the tray assembly 1 comprises magnets at least one magnet 105 attached at least one lateral end 14 for securing the metal slide to the tray assembly 1.

Figure 9:
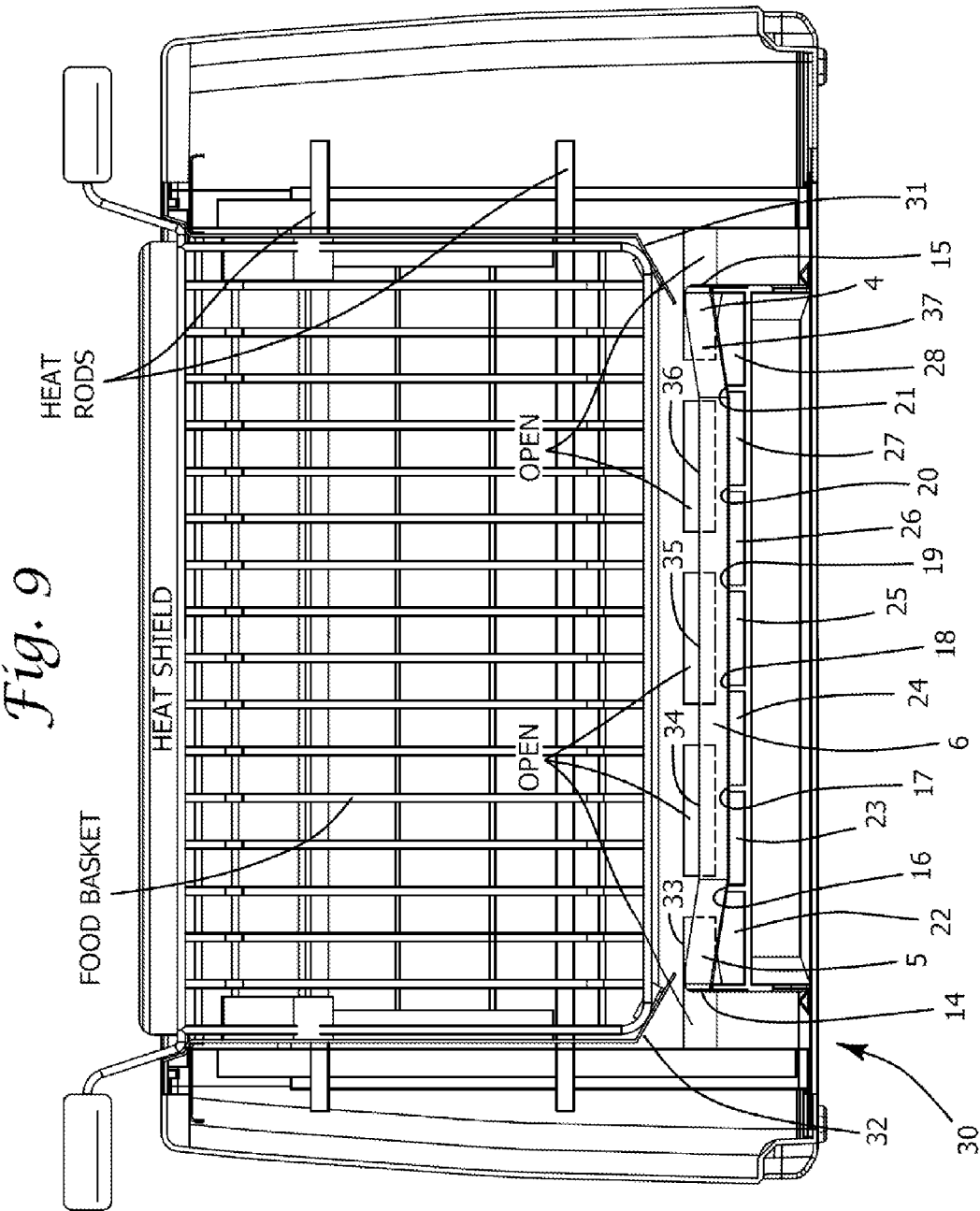
FIG. 9 is a section view though plane B-B of FIG. 14 through the center of vertical grill.
Figure 10:
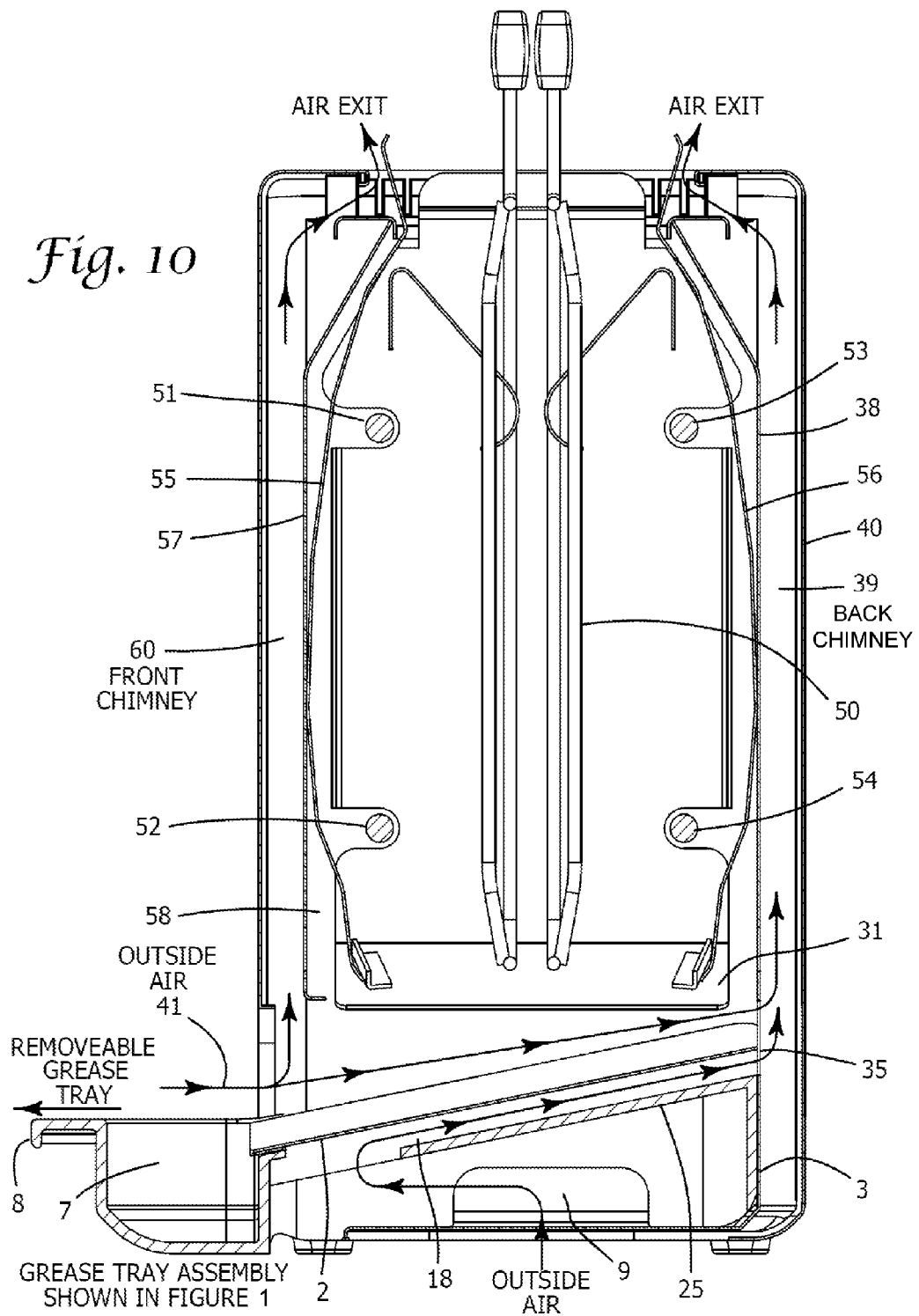
FIG. 10 is a right side cross-section view through plane C-C in FIG. 14 of a vertical grill.
Figure 14:
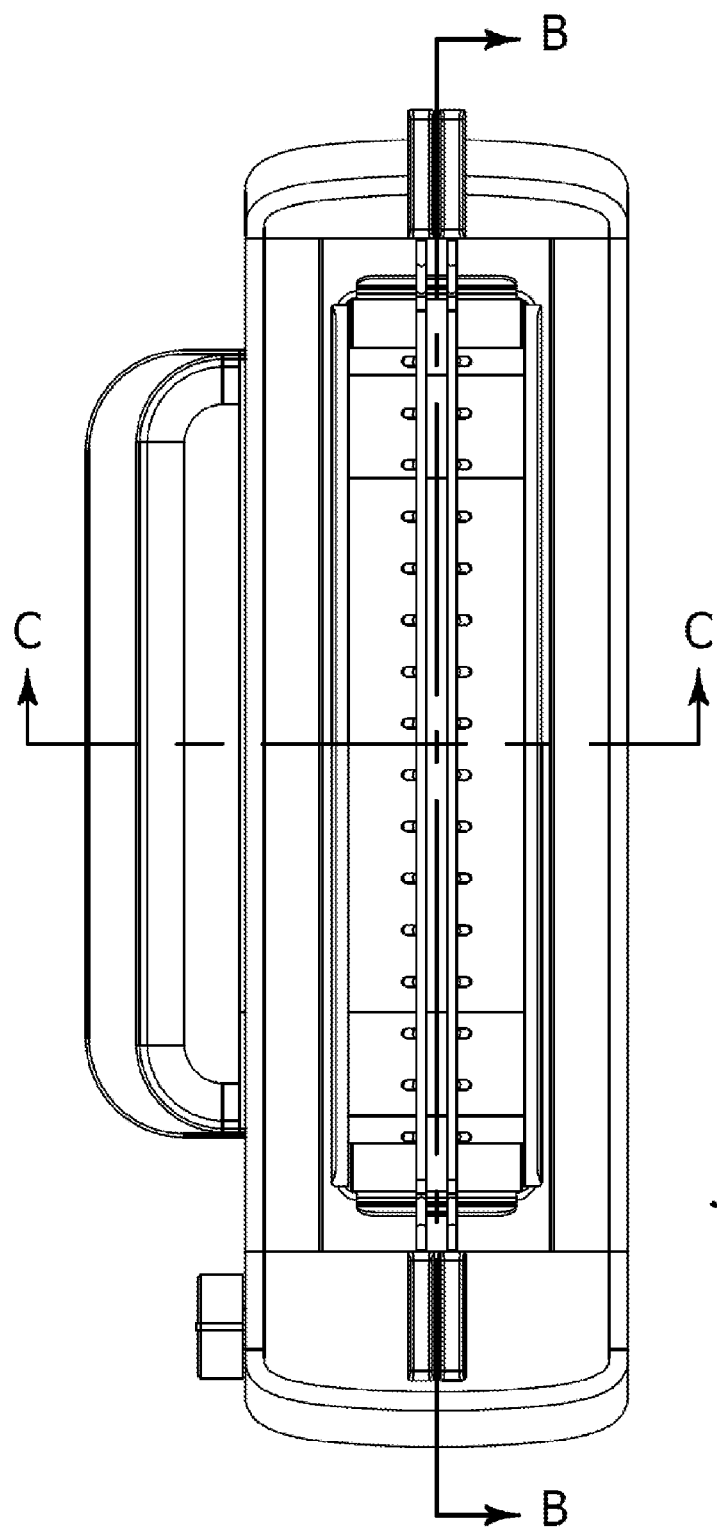
FIG. 14 is a top view of the vertical grill.

Referring now to FIGS. 9, 10, and 14, a vertical grill assembly 30 of the present invention is shown. FIG. 9 is a front cross section, FIG. 10 is a lateral cross section and FIG. 14 is a top view of the vertical grill.

The vertical grill assembly includes a back chimney 39 bounded by a back frame 38 and a back cover 40. Optionally, the vertical grill includes a front chimney 60 bounded by a front frame member 57 and a front cover. In either chimney, a chimney effect causes air be drawn into the chimney's bottom, rise up through the chimney, and exit the vertical grill assembly via an exit vent located at the top of the vertical grill assembly.

Looking at FIGS. 9 and 10, it can be seen that the back frame member 38 includes a plurality of openings (33-37). These openings enable passage of air from the tray to be back chimney 39. Optionally, a front opening is provided between the lowermost point of the grill's front cover and the uppermost point of the grease tray, to enable passage of air 41 from outside. A first portion of the air 41 rises through the front chimney 60. A second portion of the air travels along the top surface of the slide 2 and enters the back chimney 39.

In FIG. 8, it can be seen that the tray 1 rests against the back frame member 38. The slide 2 divides the opening 35 in half. The air traveling through the tunnel 18 enters the back chimney 39 via the lower half of opening 35. A chimney effect drafts this air to the top of the grill and ejects the air outward. Correspondingly, along the top side of slide 2, the air flows in direction of arrow 41 into the top half of the opening 35 and upward through the back chimney 39. Thus, the discarded waste are cooled by the air entering though the bottom opening 9 (by heat exchange with via the slide 2) and by air entering though the vertical grill's front opening (by direct contact between the air and the discarded waste). The air entering though the tray's bottom opening 9 flows into the grill via a side opening, and/or a bottom opening, and/or a front opening on the grill, which is (are) at least partially aligned with the bottom opening 9. This cooling effect lowers the risk of fire.

In a non-limiting example shown in FIG. 10, the vertical grill includes a cooking basket 50 for cooking food in the middle of the grill, surrounded by four Cal Rods 51, 52, 53 & 54 which generate heat. Removable heat shields 55 & 56 are installed behind the Cal Rods, so that the Cal Rods are located between a corresponding removable shield and the cooking basket 50. Optionally, the removable heat shields are concave, in order to reflect heat back to the food basket. The vertical grill assembly includes an inner metal frame comprising a back frame member 38, front metal frame member 57, left end frame 58 and right end frame member (not shown).

Figure 11:
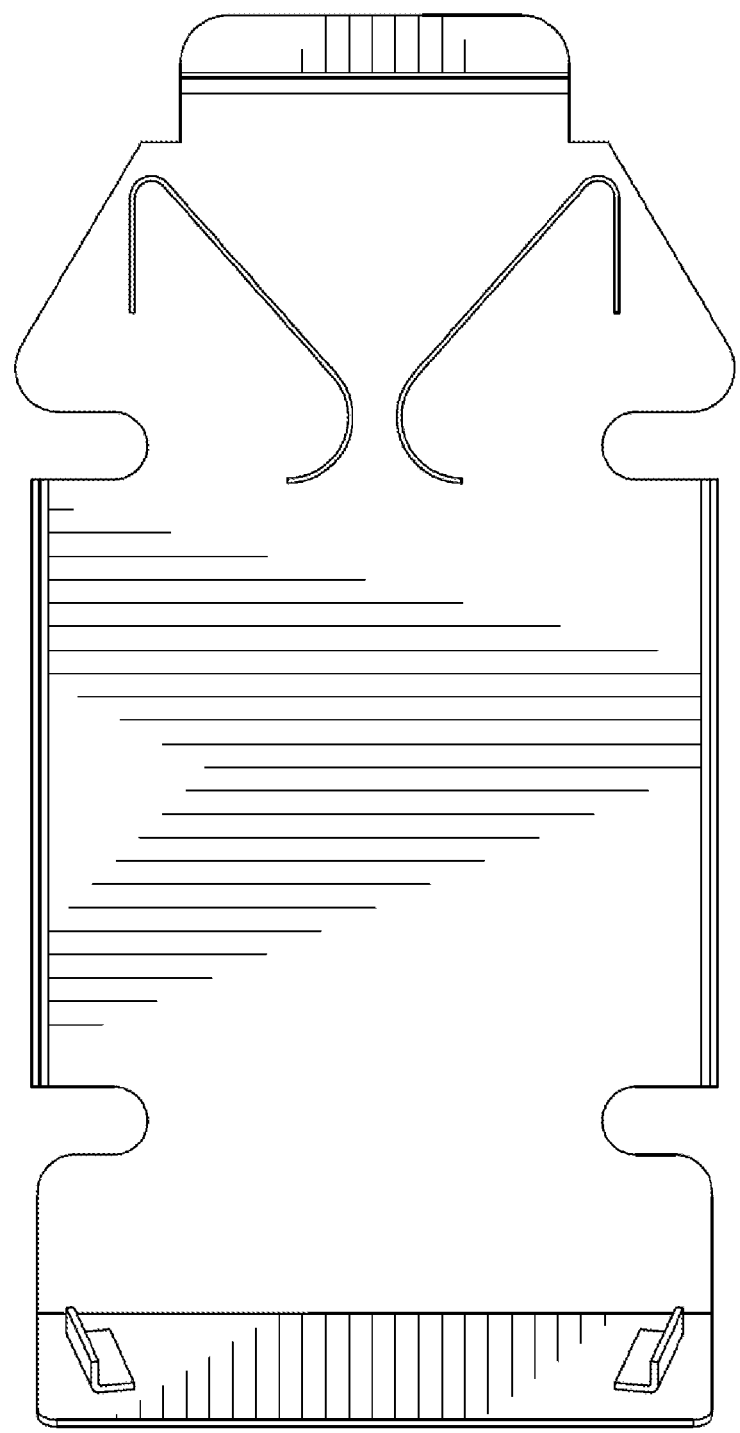
FIGS. 11-13 illustrate removable side heat shields located inside the vertical grill.
Figure 12:
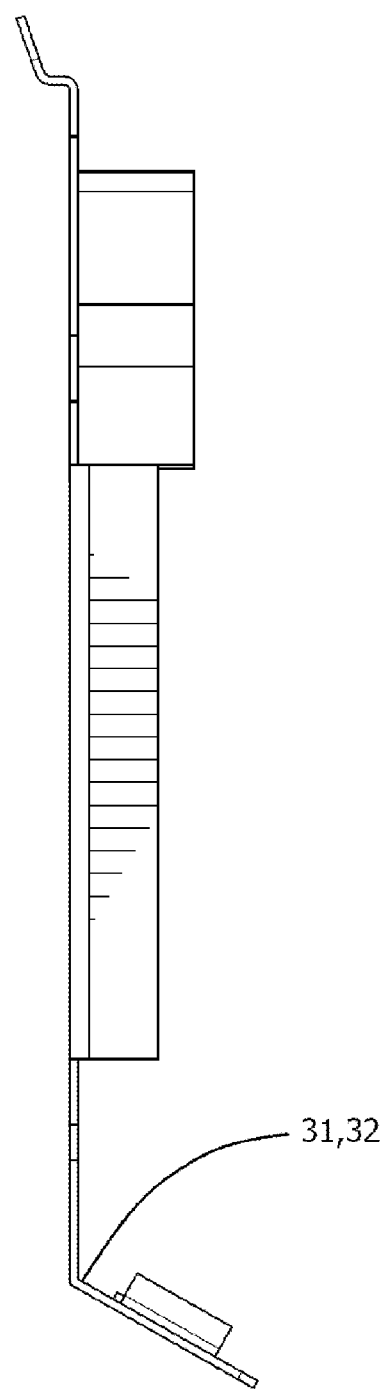
Figure 13:
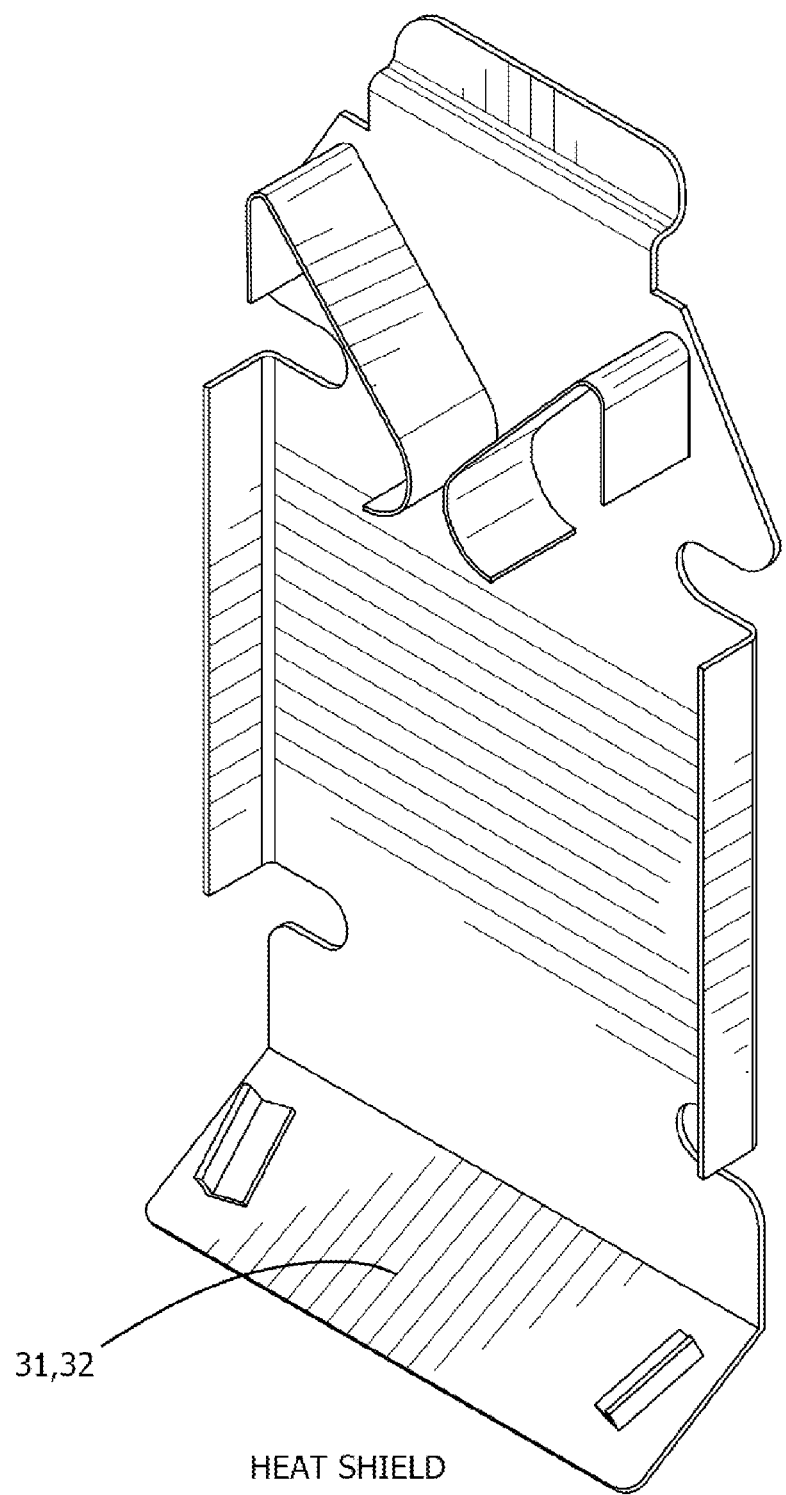

FIGS. 11-13 illustrate removable side heat shields located inside the vertical grill. A removable heat shield optionally includes surfaces 31 and 32, which are inclined downward to catch the discarded waste dripping and/or dropping from the cooking basket 50 and drains the discarded waste to the tray assembly 1. This allows the cooking basket to be wider than the grease tray. In the back inner frame wall 38 of the vertical grill are openings 33, 34, 35, 36 and 37. These openings permit air flow from inside the grill assembly to the space 39 between the outside back cover 40 and the back inner frame wall 38.

Figure 17:
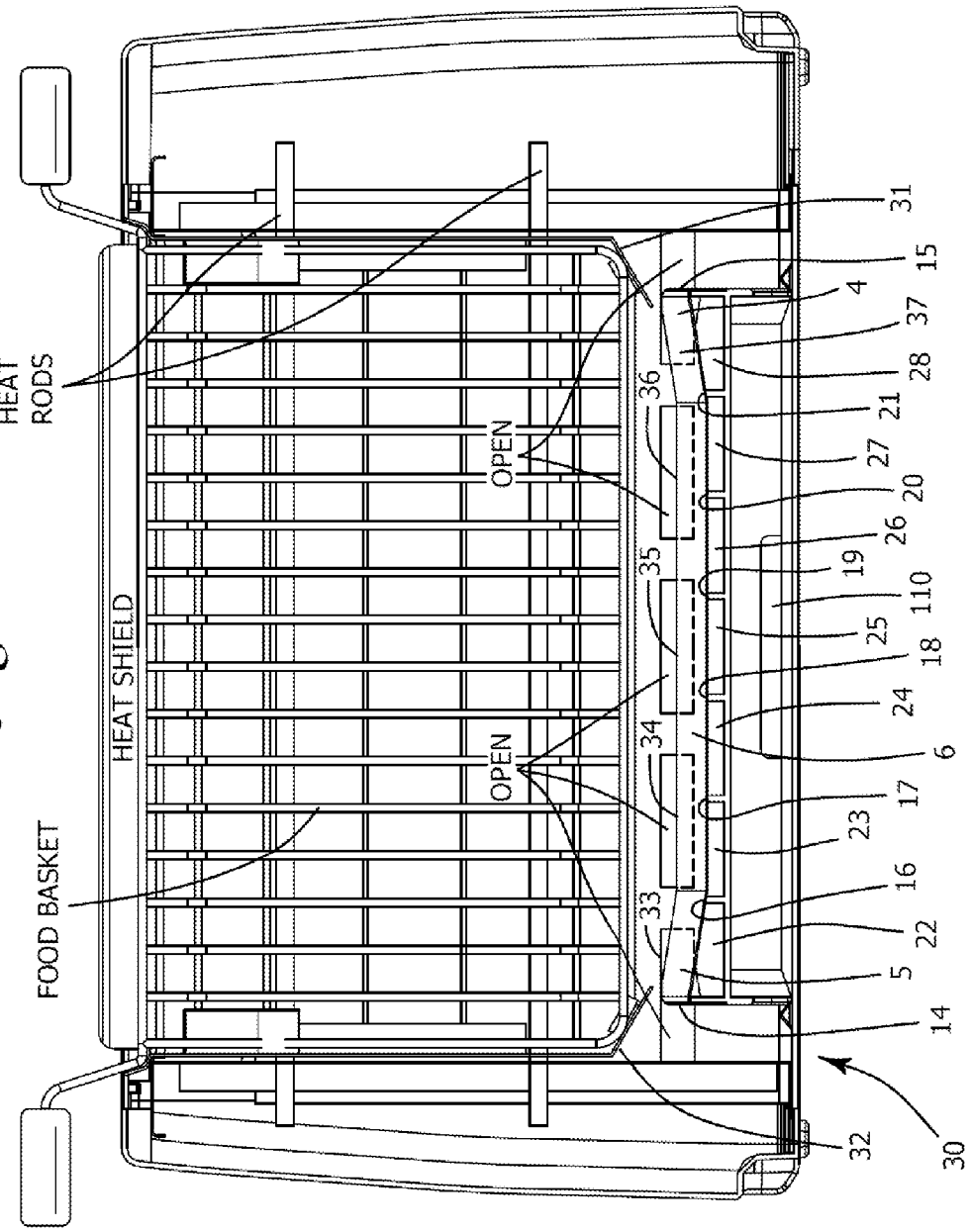
FIG. 17 is a conceptual illustration showing vent holes in the grill, hidden behind the tray, which configured for matching up with the opening in the tray of FIG. 16.
Figure 18:
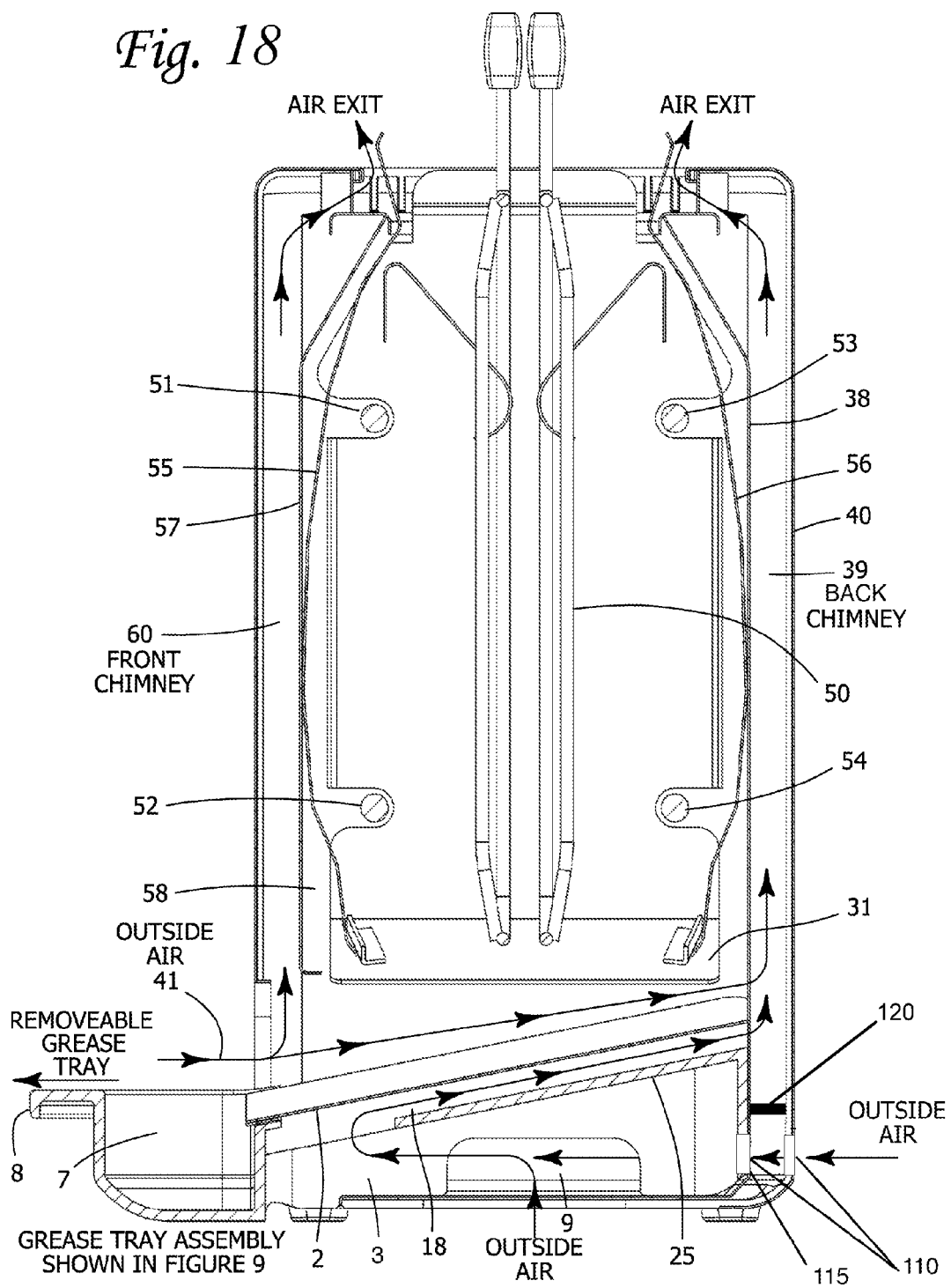
FIG. 18 is a front cross-section view through plane C-C in FIG. 14 of the vertical grill illustrating placement of the vent holes configured for alignment with the opening in the tray of FIG. 16.
Figure 19:
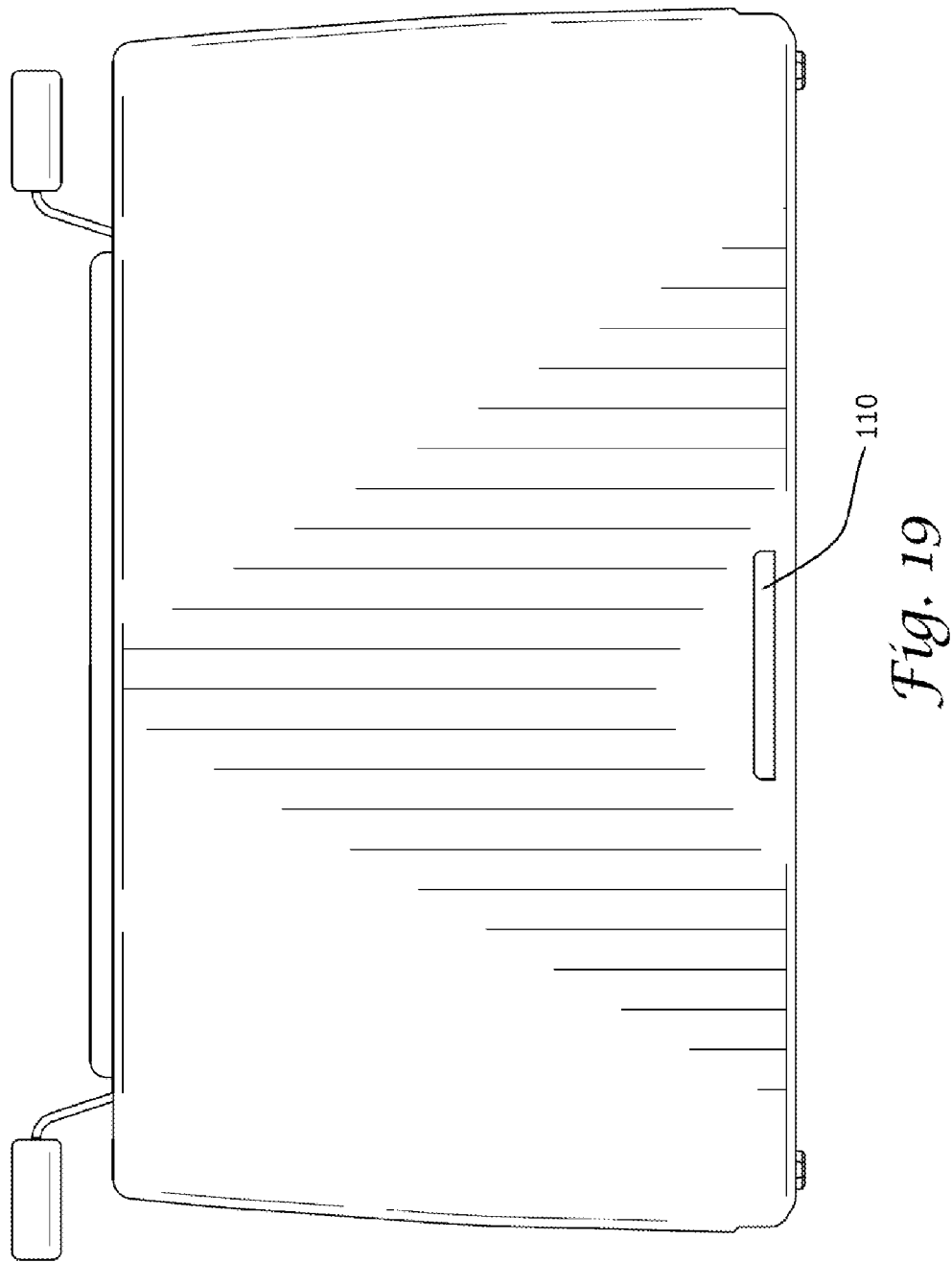
FIG. 19 is a back view of the grill of FIG. 14, showing a back opening aligned with the side air intake opening of the tray.

In a variant, referring to FIGS. 17-19, the vertical grill with external drip tray module 1 has an opening 115 in the back of the tray and corresponding similarly shaped vent holes 110 for aligning with the opening 115 of the tray in the inner and outer walls of the grill. The opening 110 together with the vent holes 115 provide additional cooling airflow through the vertical grill with external drip tray module 1. In some embodiments of the present invention, the region between the vent holes 110 and is separated from the back chimney by a wall 120. This separation prevents air entering the vertical grill via the vent holes 110 from traveling within the back chimney. In this manner, air entering via the vent holes 110 continues through the vent hole 115, external drip tray module 1 and follows the path in the air tunnels 18 to cool the top slide 2.

Figure 21:
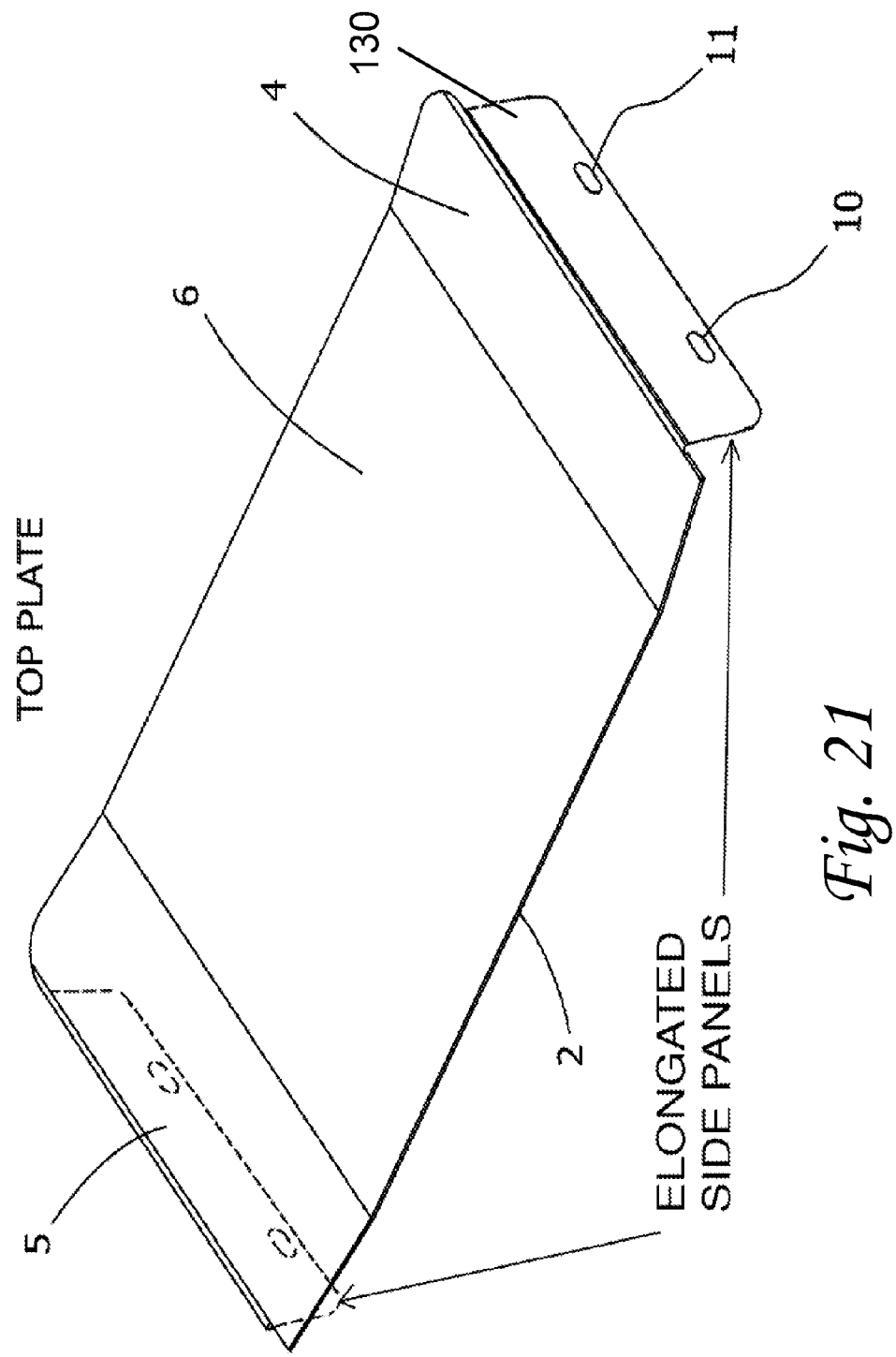
FIG. 21 is an isometric view of a top slide with elongated side panels sides, according to some embodiments of the present invention.
Figure 22:
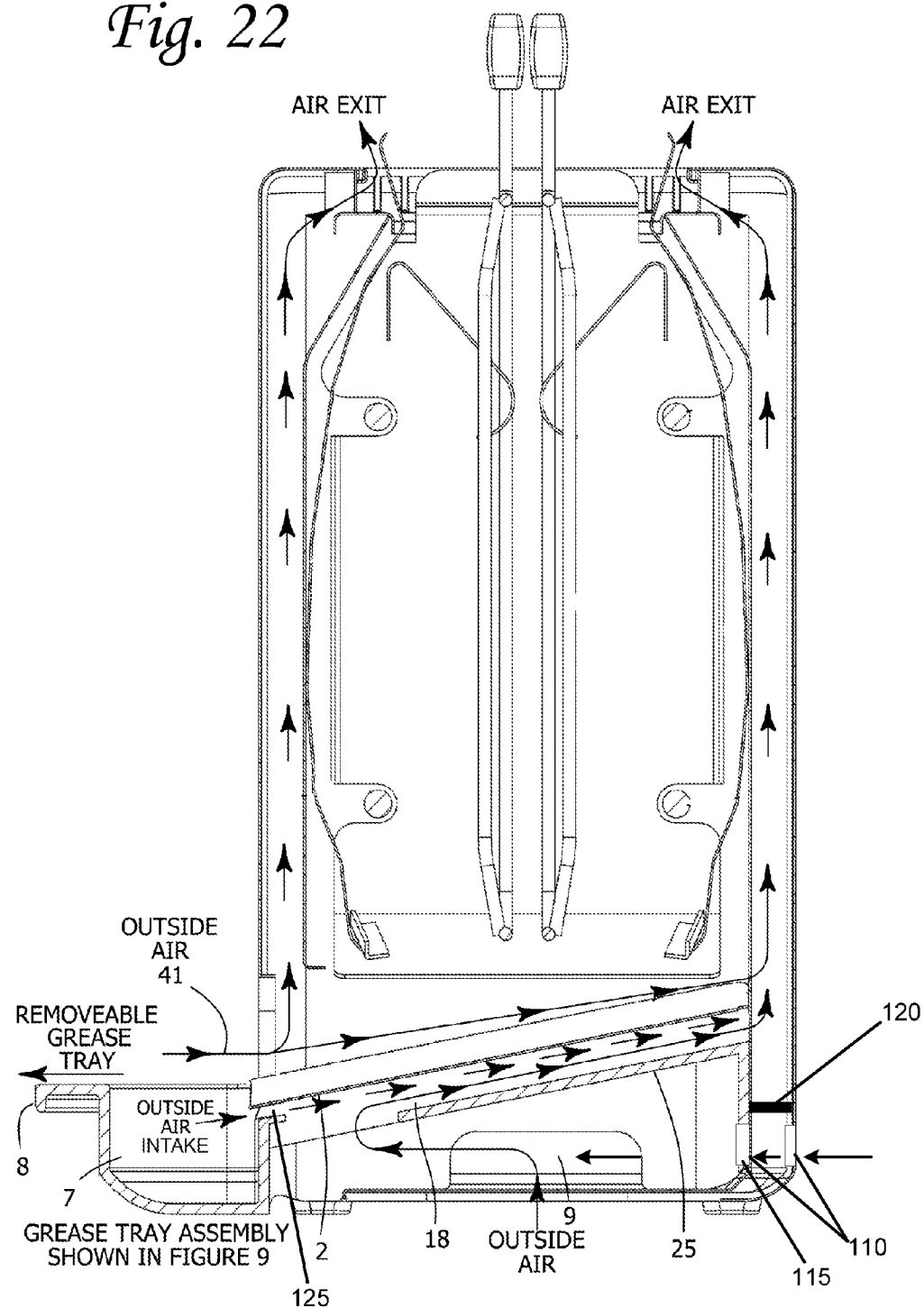
FIG. 22 is a right side view of the grease tray assembly illustrating air flow via a gap between the bottom floor of the tray and the top slide having elongated sides.

Referring to FIGS. 21 and 22, an embodiment of the present invention is presented, in which the top slide 2 of the drip tray module includes elongated side panels 130. FIG. 21 is an isometric view of a top plate/slide with elongated side panels, according to some embodiments of the present invention. FIG. 22 is a right side view of the grease tray assembly illustrating air flow via a gap between the floor members of the bottom tray and the plate or slide which has elongated side panels.

Similarly to FIGS. 1 and 4, each side panel 130 of top plate 2 includes one or more slots (e.g., the slots 10 and 11) configured for mating with corresponding holding buttons 13 located on the side of the bottom tray. Because the side panels are elongated, a gap 125 is formed on the front of the tray assembly 1, between the top plate 2 and the bottom tray when the top plate is joined to the bottom tray. In this manner, air may enter tray assembly via the gap 125, travel in the region between the top plate and the bottom tray to cool the top plate 2, and enter the back chimney, before being expelled via the air exits.

It should be noted that in the example of FIG. 22, four air intakes are shown, for drawing outside air to cool the top plate 2: (i) the front opening above the plate 2, (ii) the bottom opening 9 of the bottom tray, (iii) the intake formed by the openings 110 and 115, and (iv) the gap 125. The present invention extends to all embodiments in which any one of these intakes is present, to embodiments in which any subset of these intakes is present, and to the embodiments in which all four intakes are present.

Figure 23:
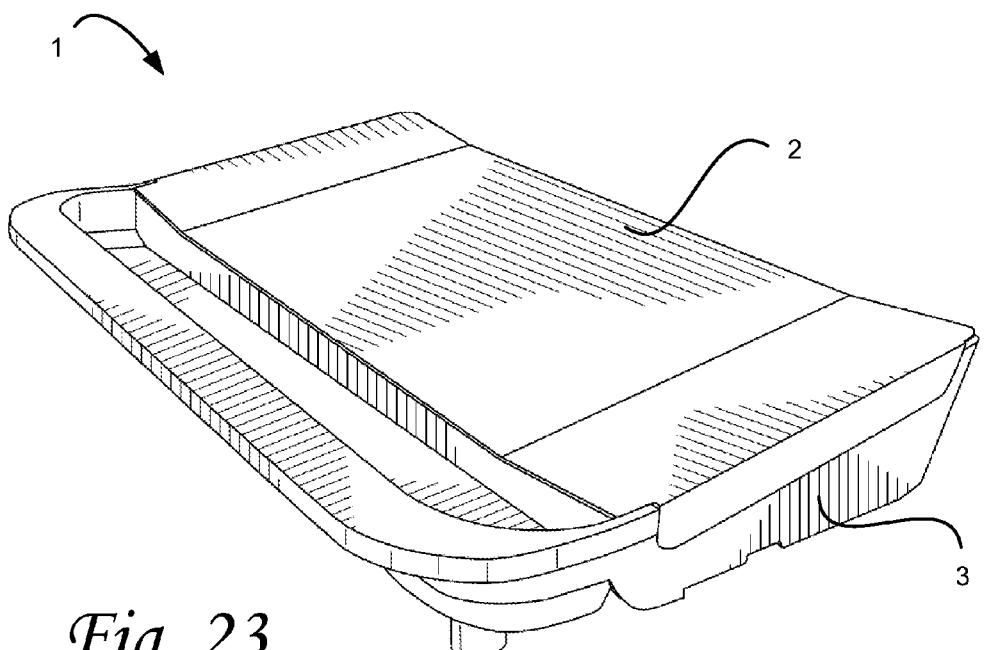
FIGS. 23-25 are perspective drawings illustrating a drip tray module of the present invention, in which an air intake gap is present on its bottom side.
Figure 24:
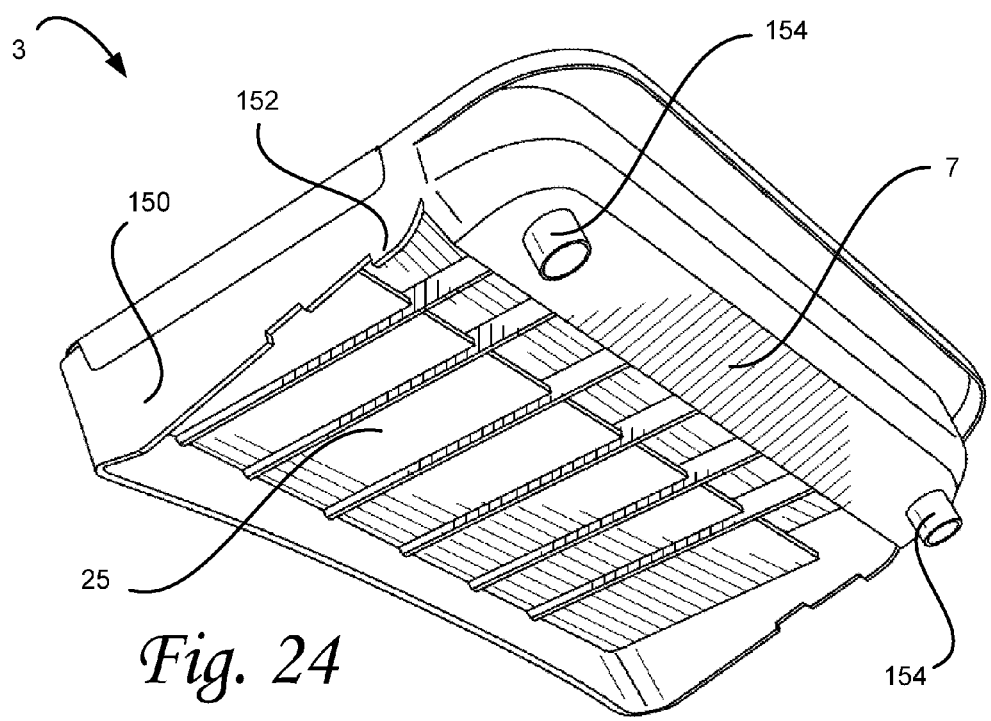
Figure 25:
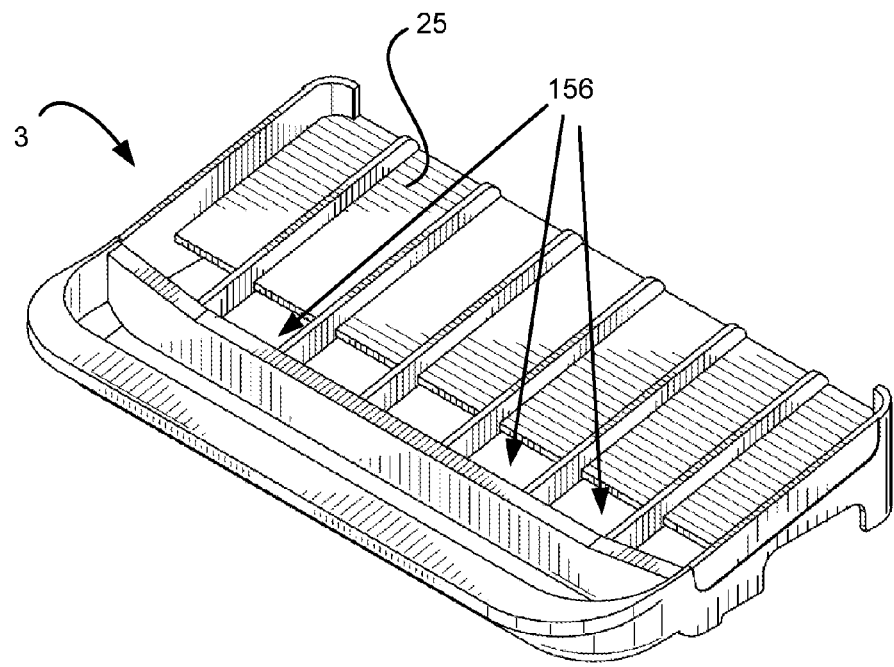

FIGS. 23-25 are perspective drawings illustrating a tray assembly of the present invention, in which an air intake opening is present on its bottom side.

The module 1 of the embodiments of FIGS. 23-25 includes a tray 3 and a plate 2. The plate is similar to the plate described in above. The tray 3 includes two lateral panels 150, at least one of which includes an extension 152 extending downward. The tray 3 also includes one or more legs 154 configured for elevating the external receptacle component 7 above a surface upon which the tray is placed. The legs may be, for example joined to the bottom panel of the external receptacle component 7. The legs 154 may also be in the form of extensions from the lateral panels 150.

The in the tray 3, the floor members 25 include openings 156. In this manner, air may flow from outside through the gap between the external receptacle component 7 and the surface on which the tray is located, and through the openings 156, to cool off the tray, as will be explained further in this document.

Figure 26:
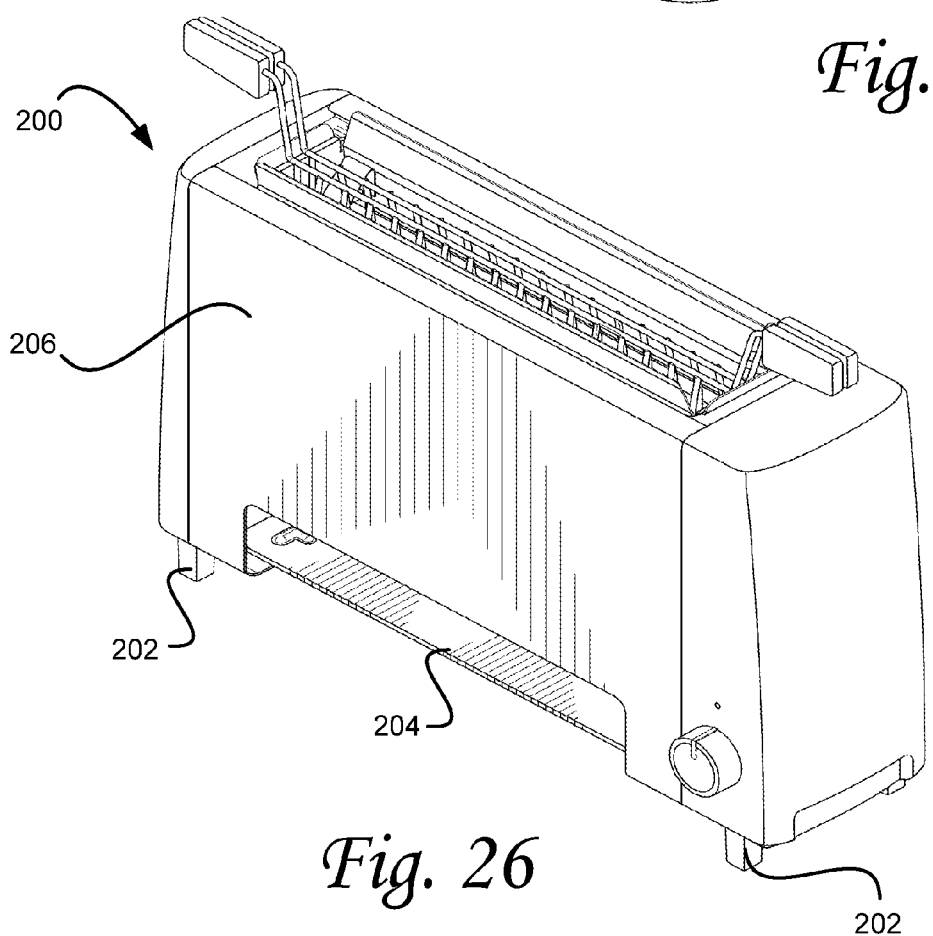
FIGS. 26 and 27 are perspective drawings illustrating a grill of the present invention, in which the base is receded with respect to the front panel.
Figure 27:
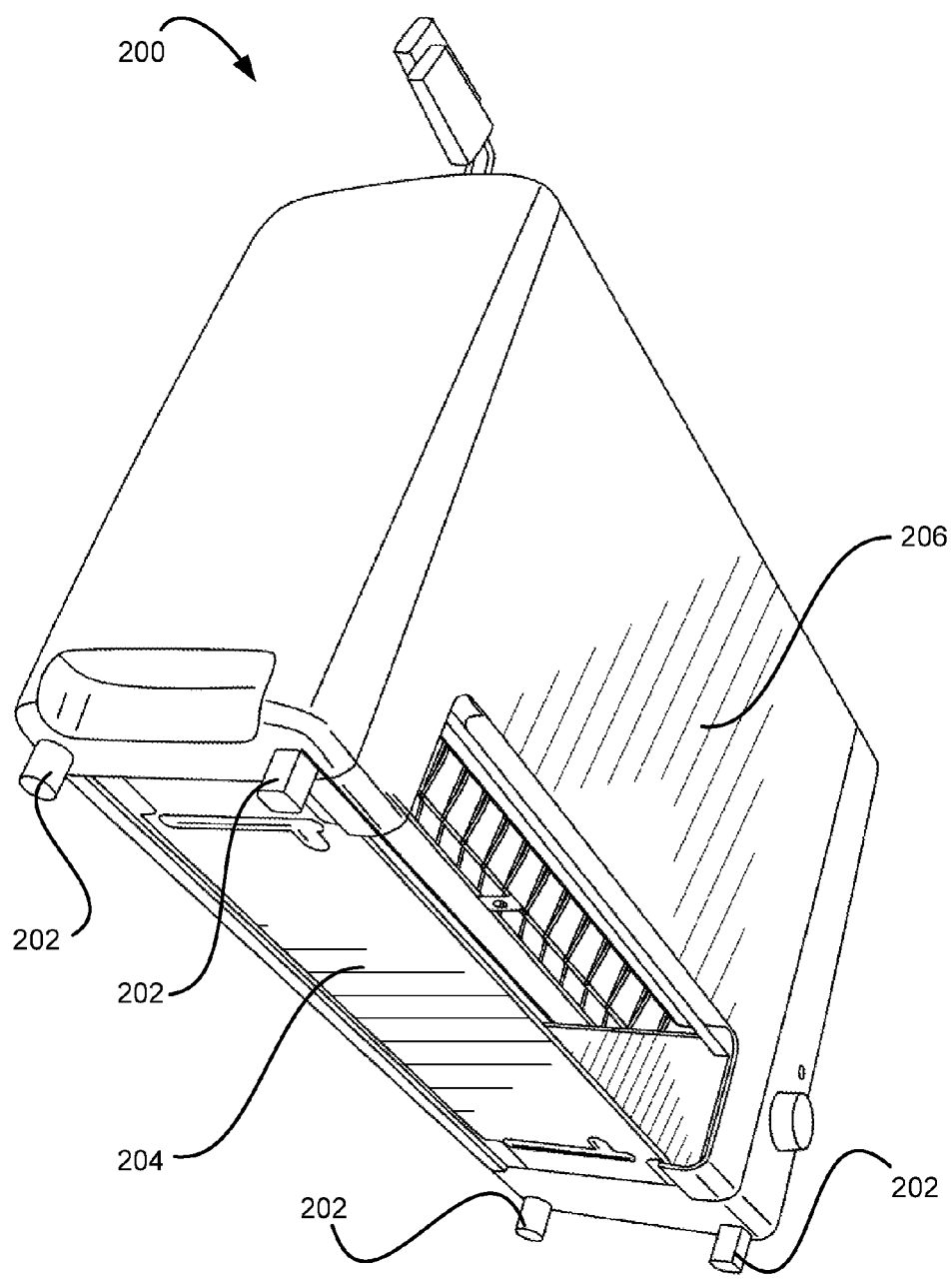

FIGS. 26 and 27 are perspective drawings illustrating a grill of the present invention, in which the base is receded with respect to the front panel.

In some embodiments of the present invention, the grill 200 includes a plurality of legs 202 joined to the bottom of the grill and keeping the grill elevated with respect to a surface upon which the grill is located. In the non-limiting example of FIGS. 26 and 27, the four legs are present.

In the embodiments of FIGS. 26 and 27, the grill 200 includes a bottom panel 204 which is receded with respect to the front panel 206. The receded bottom panel 204 is configured for coming into contact with the extension 152 of the tray module 1 and for stopping the tray module 1. As will be later explained, the grill 200, when the tray module 1 of FIGS. 23-25 is inserted into the grill 200, air may flow from under the external receptacle component 7 to the apertures 156, and along the path between the floor members 25 and the tray, to cool down the tray.

Figure 28:
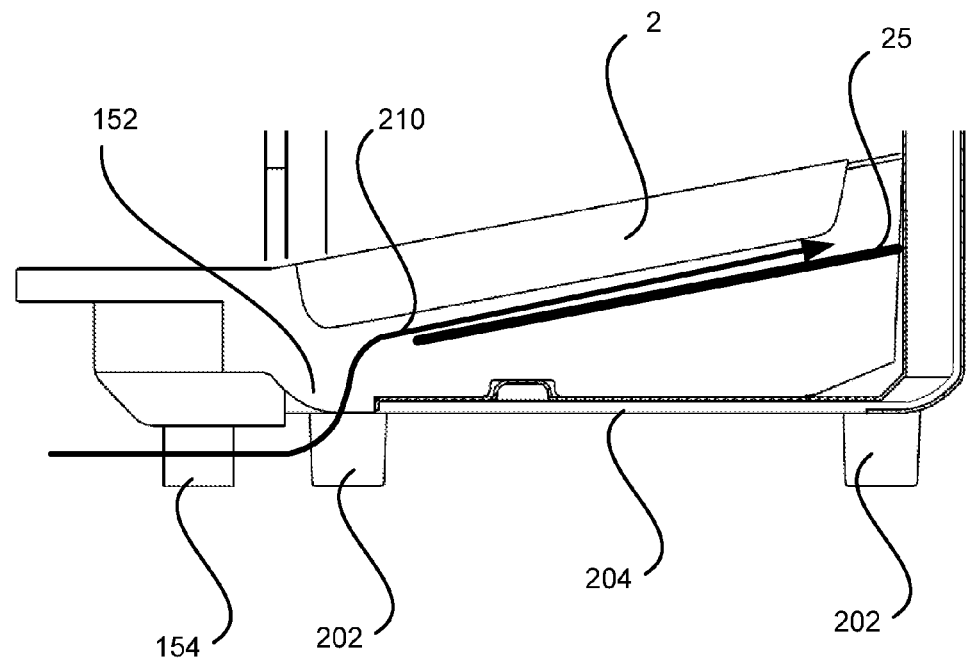
FIGS. 28 and 29 are drawings illustrating the drip tray module of FIGS. 23-25 inserted into the grill of FIGS. 26-27.
Figure 29:
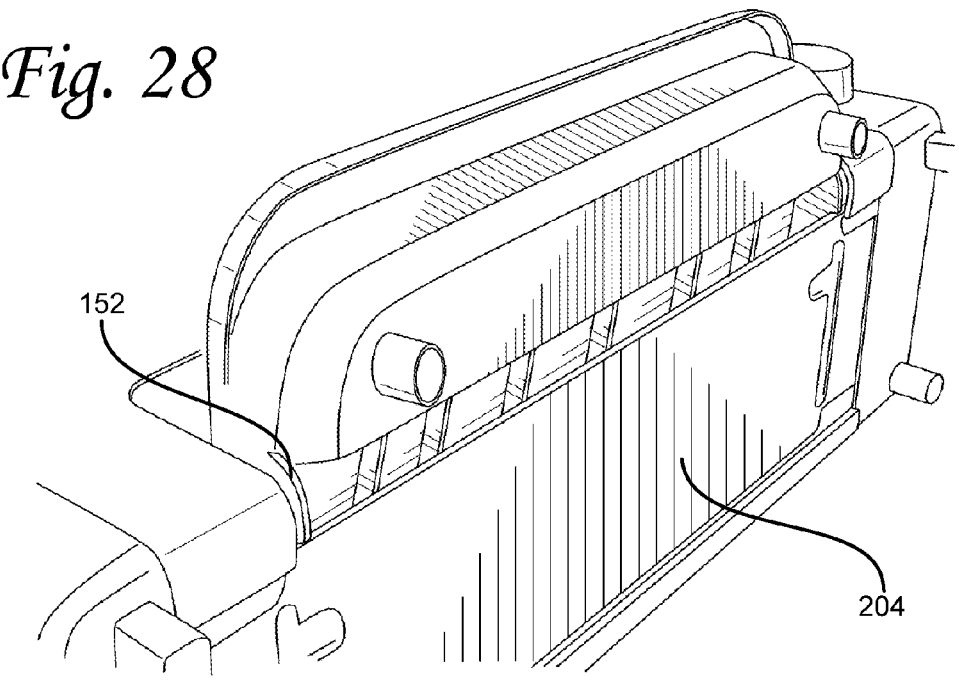

FIGS. 28 and 29 are drawings illustrating the drip tray module of FIGS. 23-25 inserted into the grill of FIGS. 26-27.

The extension 152 of the tray module 1 engages the bottom panel 204 of the grill 200 and prevents the tray module from being further inserted into the grill. The legs 202 keep the grill elevated, while the legs 154 keep the tray module elevated. In this manner, an air flow 210 is created, which passes under the tray module's external receptacle component 7, through the openings 156, and into the space between the floor members 25 and slide/plate 2.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vertical grill, comprising:
a housing which comprises a front panel, a back panel, a bottom panel, a right panel, and a left panel;
a back chimney extending vertically and bounded by a back frame member within the housing and the back panel, the back chimney having an inlet and an outlet, the inlet being in the form of one or more first openings in the back frame member, and the outlet being a second opening which is higher than the inlet;
a first air intake located at at least one of the grill's left panel, right panel, back panel, and bottom panel;
a removable tray module comprising:
a front side, back side, bottom side, and left and right sides;
a slide positioned at an incline between the front and back sides, configured to direct fats and break away solids away from back side to the front side of the tray;
at least one channel covered by the slide and configured for air flow, the channel having a front open end and a back open end, the back open end being aligned with the tray module's back side;
an external receptacle positioned at the front side of the tray, wherein the slide leads into the receptacle so that fats and break away solids may be channeled into the external receptacle after traveling downwards along the incline of the slide;
an air intake hole in at least one side of the tray module configured to allow external air into the tray module and into the at least one channel;
wherein the removable tray module is configured for being slid into and out of the grill via an aperture in the front panel, such that when the tray module is in an operating position inside the grill, the tray module's back side rests against the back frame and the back chimney's inlet is aligned with the channel's back open end, for enabling passage of air from the at least one channel to the back chimney;
wherein the air intake is at least partially aligned with the air intake hole, and the grill is configured for drawing air via the air intake, such that the drawn air passes through the air intake hole, the channel, the back chimney, and exits the back chimney's outlet.

2. The vertical grill of claim 1 wherein the aperture of the grill's front panel is sized such that a gap exists between the lowermost point of the grill's front panel and the uppermost point of the tray module when the tray module is in the operating position, the gap enabling passage of air from outside along the slide.

3. The vertical grill of claim 2 comprising a front frame member inside the housing, such that the front panel and the front member form a front chimney;
wherein the front chimney is configured for drawing at least some of the outside air via the gap.

4. The vertical grill of claim 1 wherein the grill has removable side heat shields inside the vertical grill.

5. The vertical grill of claim 1, wherein the heat shield is located beneath a cooking basket and is configured for directing fats and break away solids generated during the cooking process onto the slide.

6. The vertical grill of claim 1 comprising:
a cooking basket for holding food is in the middle of the grill;
at least one heat generating device located near the cooking basket; and
at least one removable heat shield located between the heat generating device and a panel of the housing closest to the heat generating device.

7. The grill of claim 1, wherein:
the back panel comprises at least one vent hole;
the back frame member comprises at least one vent opening aligned with the vent hole;
the back side of the removable tray module comprises at least one back aperture aligned with the vent hole and the vent opening, thus enabling air flow from outside via the vent hole, the vent opening, and the back aperture into the channel.

8. The grill of claim 7, comprising a wall between the back panel and the back frame member, the wall being located above the vent hole and the vent opening and below the inlet of the back chimney, so as to prevent entry of air from the vent hole into the back chimney.

9. The grill of claim 1, comprising one or more first legs configured for elevating the bottom panel of the grill with respect to a surface upon which the grill is located, wherein:
the bottom panel is recessed with respect to the front panel;
the drip tray module comprises one or more second legs configured for elevating the external receptacle with respect to a surface upon which the grill is located;
at least one of the left side and the right side of the drip tray module comprises an extension extending downward, and configured for engaging the bottom panel of the grill to prevent forward movement of the drip tray module inside the grill; and
the front open end of at least one channel is configured for enabling passage of air via a first space between the bottom panel and the surface upon which the grill is located and/or via a second space between the external receptacle and the surface upon which the grill is located.

10. A drip tray module for a grill configured to catch fats and break away solids generated during the cooking process, comprising:
a front side, back side, bottom side, and left and right sides;
a slide positioned at an incline between the front and back sides, configured to direct fats and break away solids away from the back side to the front side of the tray;
at least one channel for air flow covered by the slide;
an external receptacle positioned at the front side of the tray, wherein the slide leads into the receptacle so that fats and break away solids may be channeled into the external receptacle after traveling downwards along the incline of the slide;
an air intake hole in at least one side of the tray module configured to allow cool external air into the tray module, wherein the slide comprises two surfaces leading to a middle surface and disposed on either side of the middle surface and angled higher than the middle the surface; and
the tray module further comprises a step in the left and right sides to receive a recessed bottom panel of the grill, and hang over the edge of the bottom panel of the grill, when the tray is inserted into the grill.

11. A drip tray module for a grill configured to catch fats and break away solids generated during the cooking process, comprising:
a front side, back side, bottom side, and left and right sides;
a slide positioned at an incline between the front and back sides, configured to direct fats and break away solids away from the back side to the front side of the tray;
at least one channel for air flow covered by the slide;
an external receptacle positioned at the front side of the tray, wherein the slide leads into the receptacle so that fats and break away solids may be channeled into the external receptacle after traveling downwards along the incline of the slide;
an air intake hole in at least one side of the tray module configured to allow cool external air into the tray module, further comprising:
a plurality of ribs defining a plurality of channels, supporting the slide and maintaining a gap between the floor of the channels and the slide to provide air channels under the slide which enable air to flow through openings in a front end and of the channels out of openings in the back end of the channels, the back end of the channels being on the back side of the drip tray module; and
floor members in the channels; and
apertures in the floor members to allow air to flow from underneath the tray and into the channels.

12. A chip tray module for a grill configured to catch fats and break away solids generated during the cooking process, comprising:
a front side, back side, bottom side, and left and right sides;
a slide positioned at an incline between the front and back sides, configured to direct fats and break away solids away from the back side to the front side of the tray;
at least one channel for air flow covered by the slide;
an external receptacle positioned at the front side of the tray, wherein the slide leads into the receptacle so that fats and break away solids may be channeled into the external receptacle after traveling downwards along the incline of the slide;
an air intake hole in at least one side of the tray module configured to allow cool external air into the tray module, wherein the module is formed from a bottom tray and the slide, the tray module further comprising a gap formed near the front of the tray module between the slide and the bottom tray, wherein lateral side panels of the slide are of sufficient length to create the gap between the slide and the bottom tray to allow air to flow into the gap.

13. A drip tray module for a grill configured to catch fats and break away solids generated during the cooking process, comprising:
a front side, back side, bottom side, and left and right sides;
a slide positioned at an incline between the front and back sides, configured to direct fats and break away solids away from the back side to the front side of the tray;
at least one channel for air flow covered by the slide;
an external receptacle positioned at the front side of the tray, wherein the slide leads into the receptacle so that fats and break away solids may be channeled into the external receptacle after traveling downwards along the incline of the slide;
an air intake hole in at least one side of the tray module configured to allow cool external air into the tray module, wherein a plate is made of metal and the drip tray module includes magnets configured to attach the metal plate to the tray module.

14. A drip tray module for a grill configured to catch fats and break away solids generated during the cooking process, comprising:
a front side, back side, bottom side, and left and right sides;
a slide positioned at an incline between the front and back sides, configured to direct fats and break away solids away from the back side to the front side of the tray;
at least one channel for air flow covered by the slide;
an external receptacle positioned at the front side of the tray, wherein the slide leads into the receptacle so that fats and break away solids may be channeled into the external receptacle after traveling downwards along the incline of the slide;
an air intake hole in at least one side of the tray module configured to allow cool external air into the tray module, wherein the sides of the tray form an air space underneath the tray that allows for air flow from below the tray and into channels formed below the slide via apertures in the floor of the channels.

\* \* \* \* \*